US012540476B2

(12) United States Patent

Kosuge et al.

(10) Patent No.: US 12,540,476 B2

(45) Date of Patent: Feb. 3, 2026

(54) BINDING MACHINE

(71) Applicant: MAX CO., LTD., Tokyo (JP)

(72) Inventors: Makoto Kosuge, Tokyo (JP); Shingo Takahashi, Tokyo (JP); Terufumi Hamano, Tokyo (JP)

(73) Assignee: Max Co., Ltd., Tokyo (JP)

( * ) Notice: Subject to any disclaimer, the term of this patent is extended or adjusted under 35 U.S.C. 154(b) by 315 days.

(21) Appl. No.: 18/116,022

(22) Filed: Mar. 1, 2023

(65) Prior Publication Data

US 2023/0279681 A1 Sep. 7, 2023

(30) Foreign Application Priority Data

Mar. 2, 2022 (JP) ................................ 2022-031360

(51) Int. Cl.
*E04G 21/12* (2006.01)
*B25B 25/00* (2006.01)

(52) U.S. Cl.
CPC ............ *E04G 21/123* (2013.01); *B25B 25/00* (2013.01)

(58) Field of Classification Search
CPC .......... B21F 15/00; B21F 15/02; B21F 15/04; B65B 13/22; B65B 13/28; B65B 13/285; B65B 13/025; B65B 13/04; B65B 13/06; B65B 27/10; B25B 25/00; E04G 21/123
See application file for complete search history.

(56) References Cited

U.S. PATENT DOCUMENTS 5,871,036 A 2/1999 Murayama et al.
5,944,064 A * 8/1999 Saito .................... E04G 21/122 140/57
2017/0218631 A1* 8/2017 Matsuno ................ B21F 15/04
2021/0178454 A1* 6/2021 Mizuno .................. B21F 15/04
2021/0245904 A1 8/2021 Itagaki et al.
2021/0245906 A1 8/2021 Morimura et al.
2021/0404196 A1 12/2021 Asakura
2023/0406557 A1 12/2023 Itagaki et al.

FOREIGN PATENT DOCUMENTS

DE 102021116614 A1 * 12/2021 ............ B65B 13/28
EP 3 862 511 A1 8/2021
JP 3013880 B2 2/2000
JP 2021127567 A 9/2021
KR 20100114755 A 10/2010

OTHER PUBLICATIONS

Translation of DE-102021116614.*
Extended European Search Report dated Jul. 20, 2023, issued by the European Patent Office in the corresponding European Patent Application No. 23159656.0. (8 pages).

* cited by examiner

*Primary Examiner* — Bobby Yeonjin Kim

(74) *Attorney, Agent, or Firm* — Banner & Witcoff, Ltd.

(57) ABSTRACT

A binding machine includes: a rotation shaft driven by a motor to rotate; a movable body that moves in an axial direction of the rotation shaft in conjunction with the rotation of the rotation shaft and that rotates about the rotation shaft; an elastic body that is compressed by the movement of the movable body along the axial direction of the rotation shaft and that is configured to apply tension to a wire adapted to bind an object to be bound by an expanding force; and a prevention member configured to prevent generation of a force for twisting the elastic body by the rotation of the movable body.

5 Claims, 14 Drawing Sheets

BINDING MACHINE

CROSS-REFERENCE TO RELATED APPLICATIONS

This application is based upon and claims the benefit of priority from prior Japanese patent application No. 2022-031360, filed on Mar. 2, 2022, the entire contents of which are incorporated herein by reference.

TECHNICAL FIELD

The present invention relates to a binding machine that binds an object to be bound, such as a reinforcing bar, with a wire.

BACKGROUND ART

Reinforcing bars are used in concrete structures to improve a strength thereof, and are bound with wires such that the reinforcing bars do not deviate from a predetermined position when the concrete is poured.

In the related art, there has been proposed a binding machine called a reinforcing bar binding machine that winds a wire around two or more reinforcing bars, and twists the wire wound around the reinforcing bars to bind the two or more reinforcing bars with the wire.

When reinforcing bars are bound with the wire, if the binding is loose, the reinforcing bars are deviated from one another, and therefore, it is required to firmly hold the reinforcing bars together. There has been proposed a technique in which a twisting unit that twists a wire wound around reinforcing bars is provided so as to be able to approach or separate from the reinforcing bars, the twisting unit is biased by a coil spring in a rearward direction that is a direction away from the reinforcing bars, and the wire is twisted while tension is applied to the wire, thereby improving a binding force (for example, see Japanese Patent No. 3013880).

Patent Literature 1: Japanese Patent No. 3013880

When the wire is twisted by the twisting unit, a force for twisting the coil spring is generated. However, when the force for twisting the coil spring is generated with respect to the coil spring that applies the tension to the wire by compression and extension, durability of the coil spring decreases.

SUMMARY OF INVENTION

The present invention has been made to solve such a problem, and an object thereof is to provide a binding machine capable of preventing generation of a force for twisting an elastic body that applies tension to a wire.

According to an aspect of the invention, there is provided a binding machine including: a rotation shaft driven by a motor to rotate; a movable body that moves in an axial direction of the rotation shaft in conjunction with the rotation of the rotation shaft and that rotates about the rotation shaft; an elastic body that is compressed by the movement of the movable body along the axial direction of the rotation shaft and that is configured to apply tension to a wire adapted to bind an object to be bound by an expanding force; and a prevention member configured to prevent generation of a force for twisting the elastic body by the rotation of the movable body.

According to an aspect of the invention, in a binding machine that binds an object to be bound such as a reinforcing bar with a wire, a force for twisting by the rotation of the movable body is prevented from generating on the elastic body compressed by the movement of the movable body along the axial direction of the rotation shaft.

According to an aspect of the invention, durability of the elastic body can be improved by preventing generation of the force for twisting the elastic body exhibiting a desired function by compression and extension.

DESCRIPTION OF EMBODIMENTS

Hereinafter, an example of a reinforcing bar binding machine according to an embodiment of a binding machine of the present invention will be described with reference to the drawings.

Figure 1:
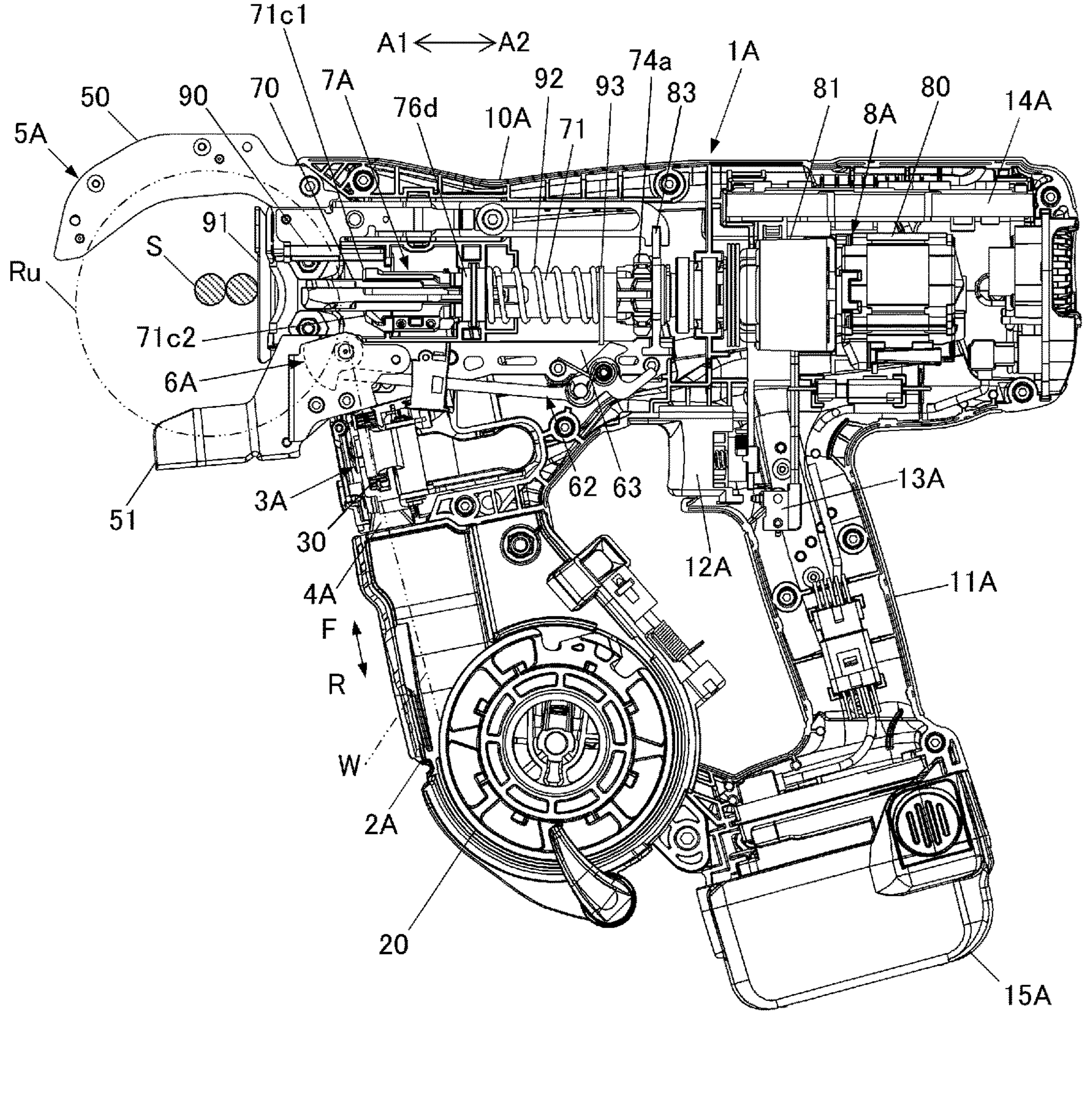
FIG. 1 is an internal configuration view viewed from a side illustrating an example of an overall configuration of a reinforcing bar binding machine according to a first embodiment.
Figure 2A:
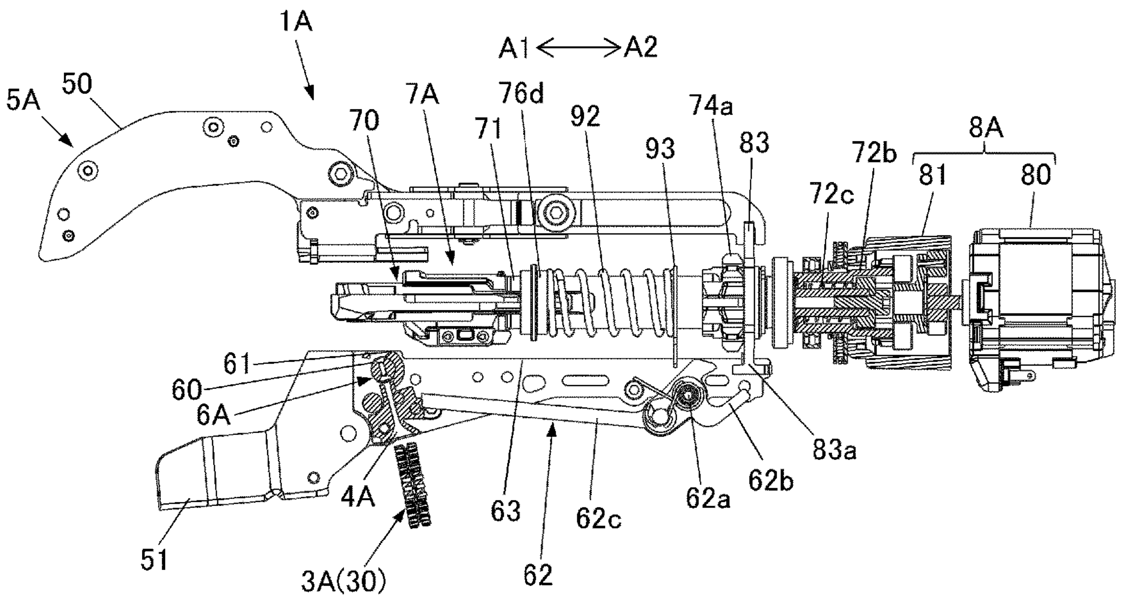
FIG. 2A is a partial side sectional view illustrating an example of a main part configuration of the reinforcing bar binding machine according to the first embodiment.
Figure 2B:
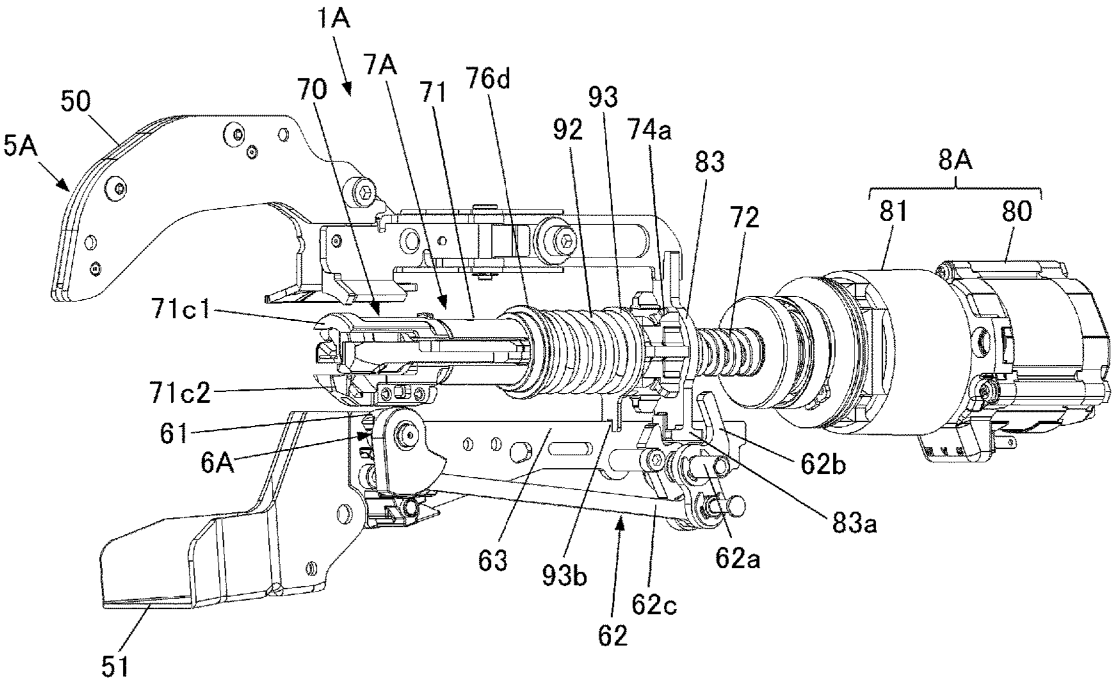
FIG. 2B is a perspective view illustrating an example of the main part configuration of the reinforcing bar binding machine according to the first embodiment.
Figure 2C:
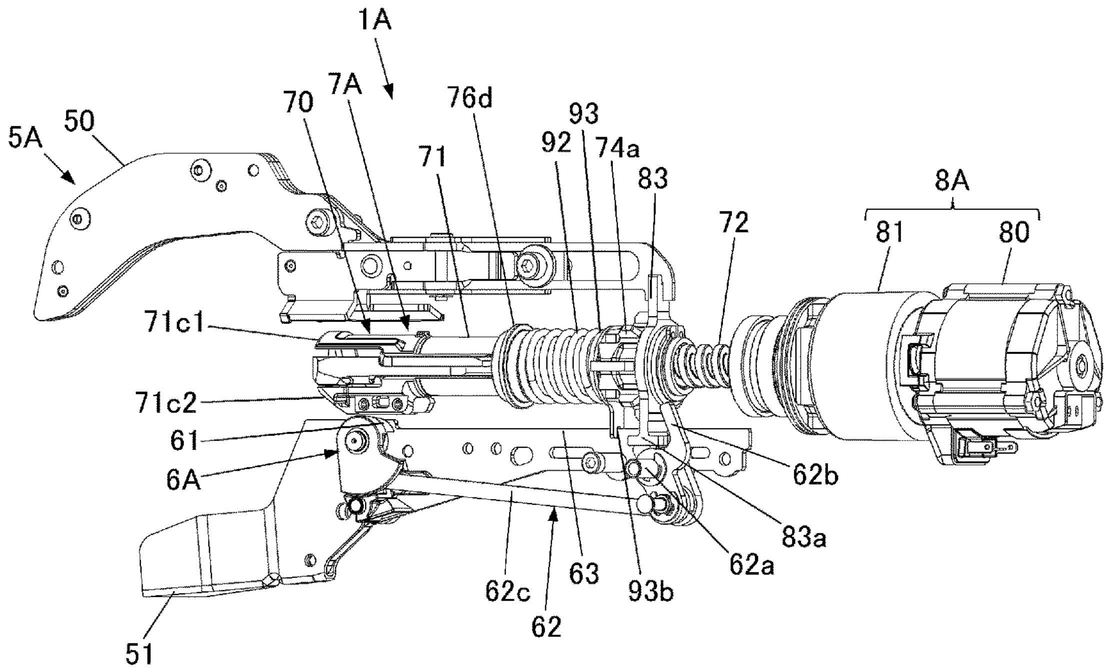
FIG. 2C is a perspective view illustrating an example of the main part configuration of the reinforcing bar binding machine according to the first embodiment.

Configuration Example of Reinforcing Bar Binding Machine According to First Embodiment FIG. 1 is an internal configuration view viewed from a side illustrating an example of an overall configuration of a reinforcing bar binding machine according to a first embodiment. FIG. 2A is a partial side sectional view illustrating an example of a main part configuration of the reinforcing bar binding machine according to the first embodiment. FIGS. 2B and 2C are perspective views illustrating examples of the main part configuration of the reinforcing bar binding machine according to the first embodiment.

A reinforcing bar binding machine 1A is held and used by an operator, and includes a main body portion 10A and a handle portion 11A. Further, the reinforcing bar binding machine 1A feeds a wire W in a forward direction indicated by an arrow F, winds the wire W around reinforcing bars S that is an object to be bound, feeds the wire W wound around the reinforcing bars S in a reverse direction indicated by an arrow R, winds the wire W around the reinforcing bars S, and then twists the wire W to bind the reinforcing bars S with the wire W.

In order to implement the above-described function, the reinforcing bar binding machine 1A includes a magazine 2A in which the wire W is accommodated, a wire feeding unit 3A that feeds the wire W, and a wire guide 4A that guides the wire W fed to the wire feeding unit 3A. The reinforcing bar binding machine 1A further includes a curl forming unit 5A that constitutes a path for winding the wire W fed by the wire feeding unit 3A around the reinforcing bars S, and a cutting unit 6A that cuts the wire W wound around the reinforcing bars S. In addition, the reinforcing bar binding machine 1A includes a binding unit 7A for twisting the wire W wound around the reinforcing bars S and a driving unit 8A that drives the binding unit 7A.

The magazine 2A is an example of an accommodating unit, and a reel 20 around which the wire W, which is long, is wound so as to be fed out is rotatably and detachably housed in the magazine 2A. As the wire W, a wire formed of a metal wire capable of plastic deformation, a wire in which a metal wire is coated with a resin, or a stranded wire is used. In the reel 20, one or a plurality of wires W are wound around a hub portion (not illustrated) such that one or the plurality of wires W can be pulled out simultaneously from the reel 20.

The wire feeding unit 3A includes a pair of feeding gears 30 that sandwich and feed one or a plurality of wires W arranged in parallel. In the wire feeding unit 3A, a rotation operation of a feeding motor (not illustrated) is transmitted to rotate the feeding gears 30. Accordingly, the wire feeding unit 3A feeds the wire W sandwiched between the pair of feeding gears 30 along an extending direction of the wire W. In a configuration in which the plurality of wires W, for example, 2 wires W are fed, the 2 wires W are fed in parallel.

In the wire feeding unit 3A, a rotation direction of the feeding gears 30 is switched by switching forward and reverse rotation directions of the feeding motor (not illustrated), and forward and reverse feeding directions of the wire W are switched.

The wire guide 4A is disposed upstream of the feeding gears 30 in a feeding direction of the wire W fed in the forward direction. In the configuration in which the reinforcing bar binding machine 1A binds the reinforcing bar with 2 wires W, the wire guide 4A guides the two wires W that enters between the pair of feeding gears 30 by arranging the two wires W in parallel along an arrangement direction of the pair of feeding gears 30.

In the wire guide 4A, an opening on an upstream side in the feeding direction of the wire W fed in the forward direction has a larger opening area than an opening on a downstream side, and a part or all of an inner surface of the opening is tapered. Accordingly, an operation of inserting the wire W drawn out from the reel 20 housed in the magazine 2A into the wire guide 4A can be easily performed.

The curl forming unit 5A includes a curl guide 50 that curls the wire W fed by the wire feeding unit 3A and a leading guide 51 that guides the wire W curled by the curl guide 50 to the binding unit 7A. In the reinforcing bar binding machine 1A, since the path of the wire W fed by the wire feeding unit 3A is regulated by the curl forming unit 5A, a trajectory of the wire W is a loop Ru as illustrated by a two-dot chain line in FIG. 1, and the wire W is wound around the reinforcing bars S.

The cutting unit 6A includes a fixed blade unit 60, a movable blade unit 61 that cuts the wire W in cooperation with the fixed blade unit 60, and a transmission mechanism 62 that transmits an operation of the binding unit 7A to the movable blade unit 61. The cutting unit 6A cuts the wire W by a rotation operation of the movable blade unit 61 with the fixed blade unit 60 as a fulcrum axis. The transmission mechanism 62 includes a first link 62*b* that rotates with a shaft 62*a* as a fulcrum and a second link 62*c* that connects the first link 62*b* and the movable blade unit 61, and a rotation operation of the first link 62*b* is transmitted to the movable blade unit 61 via the second link 62*c*.

The binding unit 7A includes a wire locking body 70 to which the wire W is locked. A detailed embodiment of the binding unit 7A will be described later. The driving unit 8A includes a motor 80 and a speed reducer 81 that performs deceleration and torque amplification.

The reinforcing bar binding machine 1A includes a feed regulating unit 90 against which a distal end of the wire W is abutted in a feed path of the wire W locked by the wire locking body 70. In the reinforcing bar binding machine 1A, the curl guide 50 and the leading guide 51 of the curl forming unit 5A described above are provided on a front-side end portion of the main body portion 10A. Further, in the reinforcing bar binding machine 1A, an abutting unit 91 against which the reinforcing bars S is abutted is provided between the curl guide 50 and the leading guide 51 in the front-side end portion of the main body portion 10A.

In the reinforcing bar binding machine 1A, the handle portion 11A extends downward from the main body portion 10A. Further, a battery 15A is detachably attached to a lower portion of the handle portion 11A. In the reinforcing bar binding machine 1A, the magazine 2A is provided in front of the handle portion 11A. In the reinforcing bar binding machine 1A, the wire feeding unit 3A, the cutting unit 6A, the binding unit 7A, the driving unit 8A that drives the binding unit 7A, and the like described above are housed in the main body portion 10A.

In the reinforcing bar binding machine 1A, a trigger 12A is provided on a front side of the handle portion 11A, and a switch 13A is provided inside the handle portion 11A. In the reinforcing bar binding machine 1A, a control unit 14A controls the motor 80 and the feeding motor (not illustrated) according to a state of the switch 13A pressed by an operation of the trigger 12A.

Figure 3A:
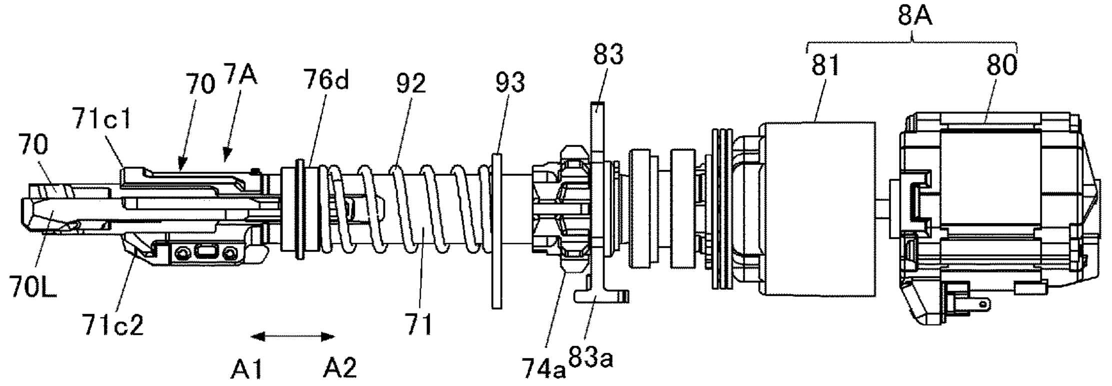
FIG. 3A is a side view illustrating the main part configuration of the reinforcing bar binding machine according to the first embodiment.
Figure 3B:
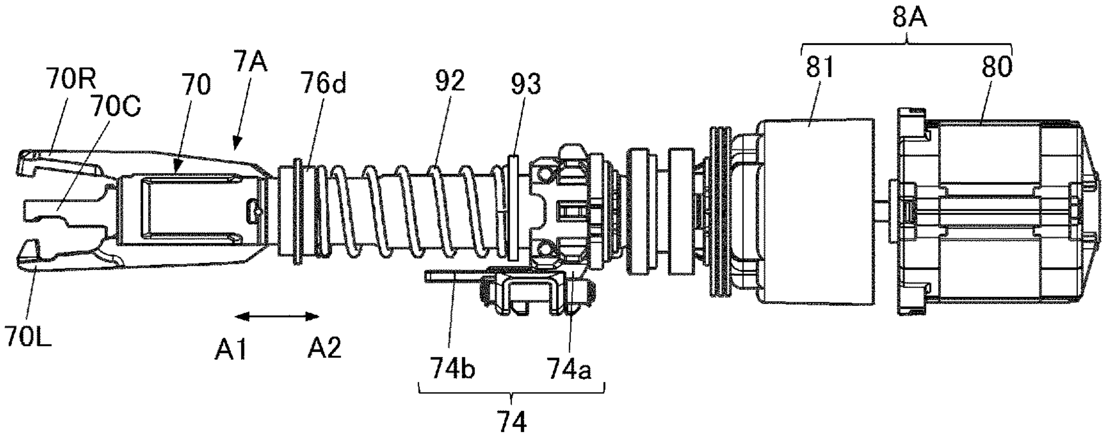
FIG. 3B is a top view illustrating the main part configuration of the reinforcing bar binding machine according to the first embodiment.
Figure 3C:
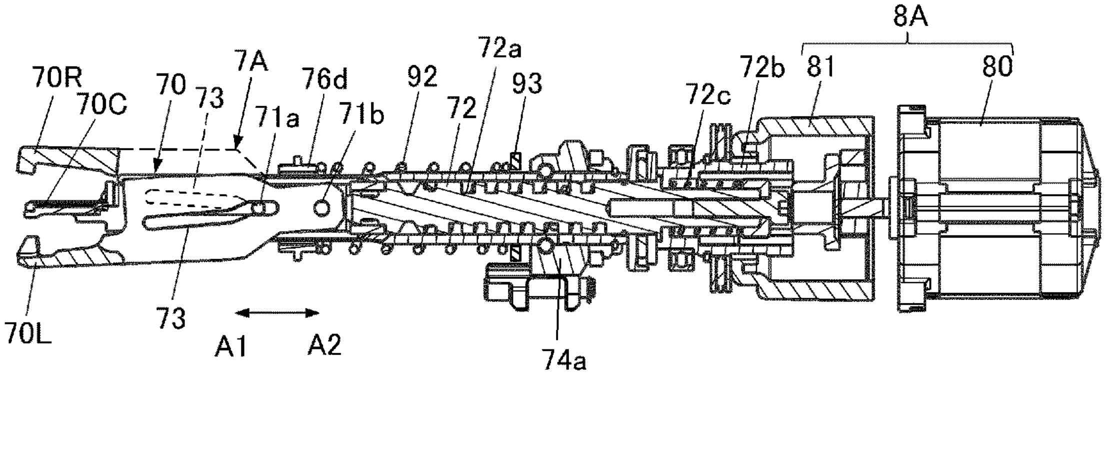
FIG. 3C is a top sectional view illustrating the main part configuration of the reinforcing bar binding machine according to the first embodiment.

FIG. 3A is a side view illustrating the main part configuration of the reinforcing bar binding machine according to the first embodiment. FIG. 3B is a top view illustrating the main part configuration of the reinforcing bar binding machine according to the first embodiment. FIG. 3C is a top sectional view illustrating the main part configuration of the reinforcing bar binding machine according to the first embodiment. Next, details of the binding unit 7A and a connection structure between the binding unit 7A and the driving unit 8A will be described with reference to the drawings.

The binding unit 7A includes the wire locking body 70 to which the wire W is locked and a rotation shaft 72 that operates the wire locking body 70. In the binding unit 7A and the driving unit 8A, the rotation shaft 72 and the motor 80 are connected to each other via the speed reducer 81, and the rotation shaft 72 is driven by the motor 80 via the speed reducer 81.

The wire locking body 70 includes a center hook 70C connected to the rotation shaft 72, a first side hook 70L and a second side hook 70R that open and close with respect to the center hook 70C, and a sleeve 71 that operates the first side hook 70L and the second side hook 70R in conjunction with a rotation operation of the rotation shaft 72.

In the binding unit 7A, a side on which the center hook 70C, the first side hook 70L, and the second side hook 70R are provided is referred to as a front side, and a side on which the rotation shaft 72 is connected to the speed reducer 81 is referred to as a rear side.

The center hook 70C is connected to the rotation shaft 72 so as to be rotatable with respect to the rotation shaft 72 at a front end which is one end portion of the rotation shaft 72, and movable in an axial direction integrally with the rotation shaft 72.

A distal end side of the first side hook 70L, which is one end portion of the first side hook 70L along an axial direction of the rotation shaft 72, is positioned on one side with respect to the center hook 70C. A rear end side of the first side hook 70L, which is the other end portion of the first side hook 70L along the axial direction of the rotation shaft 72, is rotatably supported by the center hook 70C by a shaft 71*b*.

A distal end side of the second side hook 70R, which is one end portion of the second side hook 70R along the axial direction of the rotation shaft 72, is positioned on the other side with respect to the center hook 70C. A rear end side of the second side hook 70R, which is the other end portion of the second side hook 70R along the axial direction of the rotation shaft 72, is rotatably supported by the center hook 70C by the shaft 71*b*.

Accordingly, the wire locking body 70 is opened and closed in a direction in which the distal end side of the first side hook 70L is separated from and brought into contact with the center hook 70C by a rotation operation with the shaft 71*b* as a fulcrum. In addition, the wire locking body 70 is opened and closed in a direction in which the distal end side of the second side hook 70R is separated from and brought into contact with the center hook 70C.

A rear end of the rotation shaft 72, which is the other end portion of the rotation shaft 72, is connected to the speed reducer 81 via a connecting unit 72*b* configured to be rotatable integrally with the speed reducer 81 and movable in the axial direction with respect to the speed reducer 81. The connecting unit 72*b* includes a spring 72*c* that biases the rotation shaft 72 rearward, which is a direction approaching the speed reducer 81, and regulates a position of the rotation shaft 72 along the axial direction. Accordingly, the rotation shaft 72 can move forward, which is a direction away from the speed reducer 81 while receiving a force pushed rearward by the spring 72*c*. Accordingly, when a force for moving the wire locking body 70 forward along the axial direction is applied, the rotation shaft 72 is movable forward while receiving the force pushed rearward by the spring 72*c*.

The sleeve 71 has a shape in which a range of a predetermined length along the axial direction of the rotation shaft 72 from an end portion in a forward direction indicated by an arrow A1 is divided into two ranges in a radial direction, and the first side hook 70L and the second side hook 70R are inserted into the sleeve 71. In addition, the sleeve 71 has a tubular shape covering periphery of the rotation shaft 72, and has a protrusion (not illustrated) protruding from an inner peripheral surface of a tubular space into which the rotation shaft 72 is inserted. The protrusion enters a groove portion of a feed screw 72*a* formed along the axial direction on an outer periphery of the rotation shaft 72. The sleeve 71 is an example of a movable body, and when the rotation shaft 72 rotates, the sleeve 71 moves in a front-rear direction, which is a direction along the axial direction of the rotation shaft 72, according to a rotation direction of the rotation shaft 72 by an action of the protrusion (not illustrated) and the feed screw 72*a* of the rotation shaft 72. The sleeve 71 rotates integrally with the rotation shaft 72 about the rotation shaft 72.

The sleeve 71 includes an opening and closing pin 71*a* that opens and closes the first side hook 70L and the second side hook 70R.

The opening and closing pin 71*a* is inserted into an opening and closing guide hole 73 provided in the first side hook 70L and the second side hook 70R. The opening and closing guide hole 73 extends along a moving direction of the sleeve 71, and has a shape for converting a linear movement of the opening and closing pin 71*a* moving in conjunction with the sleeve 71 into an opening and closing operation by rotation of the first side hook 70L and the second side hook 70R with the shaft 71*b* as a fulcrum.

In the wire locking body 70, when the sleeve 71 moves in a rearward direction indicated by an arrow A2, the first side hook 70L and the second side hook 70R move in a direction away from the center hook 70C by the rotation operation with the shaft 71*b* as a fulcrum according to a trajectory of the opening and closing pin 71*a* and the shape of the opening and closing guide hole 73.

Accordingly, the first side hook 70L and the second side hook 70R are opened with respect to the center hook 70C, and the feed path through which the wire W passes is formed between the first side hook 70L and the center hook 70C and between the second side hook 70R and the center hook 70C.

In a state where the first side hook 70L and the second side hook 70R are opened with respect to the center hook 70C, the wire W fed by the wire feeding unit 3A passes between the center hook 70C and the first side hook 70L. The wire W passing between the center hook 70C and the first side hook 70L is led to the curl forming unit 5A. Then, the wire W curled by the curl forming unit 5A and led to the binding unit 7A passes between the center hook 70C and the second side hook 70R.

In the wire locking body 70, when the sleeve 71 moves in the forward direction indicated by the arrow A1, the first side hook 70L and the second side hook 70R move in a direction approaching the center hook 70C by the rotation operation with the shaft 71*b* as a fulcrum according to the trajectory of the opening and closing pin 71*a* and the shape of the opening and closing guide hole 73. Accordingly, the first side hook 70L and the second side hook 70R are closed with respect to the center hook 70C.

When the first side hook 70L is closed with respect to the center hook 70C, the wire W sandwiched between the first side hook 70L and the center hook 70C is locked in a form movable between the first side hook 70L and the center hook 70C. Further, when the second side hook 70R is closed with respect to the center hook 70C, the wire W sandwiched between the second side hook 70R and the center hook 70C is locked so as not to come off from between the second side hook 70R and the center hook 70C.

The wire locking body 70 includes a bending unit 71*c*1 that forms the wire W into a predetermined shape by pressing and bending a distal end side of the wire W, which is one end portion of the wire W, in a predetermined direction, and a bending unit 71*c*2 that forms the wire W into a predetermined shape by pressing and bending a tail end side of the wire W, which is the other end portion of the wire W cut by the cutting unit 6A, in a predetermined direction. In the present example, the bending unit 71*c*1 and the bending unit 71*c*2 are formed at the end portion of the sleeve 71 in the forward direction indicated by the arrow A1.

When the sleeve 71 moves in the forward direction indicated by the arrow A1, the distal end side of the wire W locked by the center hook 70C and the second side hook 70R is pressed by the bending unit 71*c*1 and bent toward a reinforcing bar S side. Further, when the sleeve 71 moves in the forward direction indicated by the arrow A1, the tail end side of the wire W which is locked by the center hook 70C and the first side hook 70L and cut by the cutting unit 6A is pressed by the bending unit 71*c*2 and bent toward the reinforcing bar S side.

The binding unit 7A includes a rotation regulating unit 74 that regulates the rotation of the wire locking body 70 and the sleeve 71 in conjunction with the rotation operation of the shaft 72. The rotation regulating unit 74 includes a rotation regulating blade 74*a* provided on the sleeve 71 and a rotation regulating pawl 74*b* provided on the main body portion 10A.

The rotation regulating blade 74*a* is implemented by providing, at predetermined intervals in a peripheral direction of the sleeve 71, a plurality of protrusions protruding in the radial direction from an outer periphery of the sleeve 71. The rotation regulating blade 74*a* is fixed to the sleeve 71, and moves and rotates integrally with the sleeve 71.

In the rotation regulating unit 74, the rotation regulating blade 74*a* is locked to the rotation regulating pawl 74*b* in an operation range in which the wire W is locked by the wire locking body 70, the wire W is wound around the reinforcing bars S and then cut, and the wire W is bent and formed by the bending units 71*c*1 and 71*c*2 of the sleeve 71. When the rotation regulating blade 74*a* is locked to the rotation regulating pawl 74*b*, the rotation of the sleeve 71 in conjunction with the rotation of the rotation shaft 72 is regulated, and the sleeve 71 moves in the front-rear direction by the rotation operation of the rotation shaft 72.

Further, in the operation range in which the wire W locked by the wire locking body 70 is twisted, the locking of the rotation regulating blade 74*a* to the rotation regulating pawl 74*b* of the rotation regulating unit 74 is released. When the locking of the rotation regulating blade 74*a* to the rotation regulating pawl 74*b* is released, the sleeve 71 rotates in conjunction with the rotation of the rotation shaft 72. In the wire locking body 70, the center hook 70C, the first side hook 70L, and the second side hook 70R locking the wire W rotate in conjunction with the rotation of the sleeve 71.

In the operation range of the sleeve 71 and the wire locking body 70 along the axial direction of the rotation shaft 72, an operation range in which the wire W is locked by the wire locking body 70 is referred to as a first operation range. An operation range in which the wire W locked by the wire locking body 70 is cut by the cutting unit 6A is referred to as a second operation range. An operation range in which the wire W cut by the cutting unit 6A is bent and formed by the bending units 71*c*1 and 71*c*2 of the sleeve 71 is referred to as a third operation range. In addition, an operation range in which the wire W is twisted is referred to as a fourth operation range.

The binding unit 7A is provided such that a transmission member 83 is movable in conjunction with the sleeve 71. The transmission member 83 is rotatably attached to the sleeve 71 and moves in the front-rear direction in conjunction with the sleeve 71 without interlocking with the rotation of the sleeve 71.

The transmission member 83 includes an engagement unit 83*a* that engages with the first link 62*b* of the transmission mechanism 62. When the transmission member 83 moves in the front-rear direction in conjunction with the sleeve 71, the engagement unit 83*a* of the binding unit 7A engages with the first link 62*b* to rotate the first link 62*b*. The transmission mechanism 62 transmits the rotation operation of the first link 62*b* to the movable blade unit 61 via the second link 62*c* to rotate the movable blade unit 61. Accordingly, by the operation in which the sleeve 71 moves in the forward direction, the movable blade unit 61 rotates in a predetermined direction, and the wire W is cut.

The binding unit 7A includes a tension applying spring 92 that performs the binding in a state where tension is applied to the wire W. The tension applying spring 92 is an example of an elastic body, and biases the sleeve 71 and the wire locking body 70 in a direction away from the abutting unit 91 along the axial direction of the rotation shaft 72. The tension applying spring 92 is implemented by, for example, a coil spring that expands and contracts in the axial direction, and is fitted to the outer periphery of the sleeve 71 between the rotation regulating blade 74*a* and a support member 76*d* that supports the sleeve 71 so as to be rotatable and slidable in the axial direction. When the tension applying spring 92 is implemented by a coil spring, an inner diameter of the tension applying spring 92 is larger than an outer diameter of the sleeve 71.

When the sleeve 71 moves in the forward direction indicated by the arrow A1 along the axial direction of the rotation shaft 72, the tension applying spring 92 is compressed between the support member 76*d* and the rotation regulating blade 74*a*. The compressed tension applying spring 92 biases, by an extension force, the sleeve 71 in the rearward direction indicated by the arrow A2, which is the direction away from the abutting unit 91, along the axial direction of the rotation shaft 72.

Accordingly, the tension applying spring 92 biases the sleeve 71 and the wire locking body 70 including the sleeve 71 in a direction in which the tension applied to the wire W wound around the reinforcing bars S is maintained, and applies the tension to the wire W, which is cut by the cutting unit 6A after being wound around the reinforcing bars S, with a force larger than a force applied in a direction in which the wire W wound around the reinforcing bars S is loosened.

That is, a reaction force of the tension applied to the wire W by the operation of winding the wire W around the reinforcing bars S is applied to the wire locking body 70 locking the wire W, thereby applying a force for moving the wire locking body 70 in the forward direction along the axial direction of the rotation shaft 72 to the wire locking body 70. The wire locking body 70 is movable in the forward direction together with the rotation shaft 72 while receiving a force for pushing the rotation shaft 72 by the spring 72*c* in the rearward direction along the axial direction. Therefore, when the wire locking body 70 locking the wire W moves in the forward direction along the axial direction of the rotation shaft 72, the wire W wound around the reinforcing bars S is loosened.

In contrast, the wire locking body 70 receives a force for pushing the sleeve 71 in the rearward direction by the force for expanding the compressed tension applying spring 92. The force for expanding the compressed tension applying spring 92 is larger than a force for moving the wire locking body 70 in the forward direction by the reaction force of the tension applied to the wire W wound around the reinforcing bars S, and the wire locking body 70 is prevented from moving in the forward direction. Accordingly, the binding is performed in the state where the tension is applied to the wire W.

Figure 4:
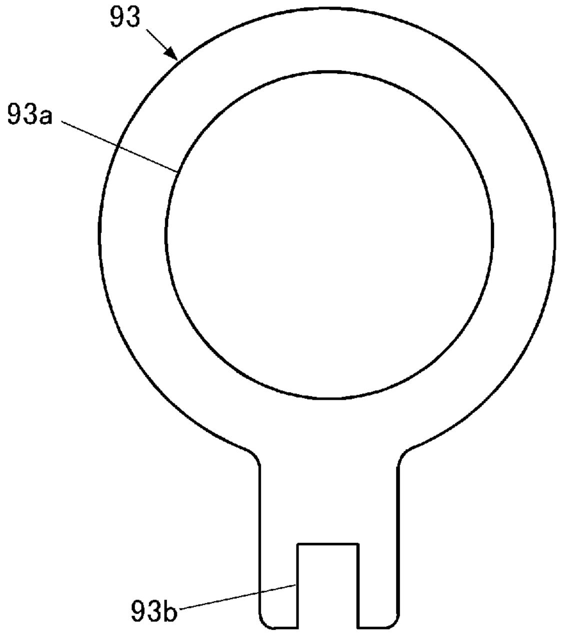
FIG. 4 is a plan view illustrating an example of a prevention member.

FIG. 4 is a plan view illustrating an example of a prevention member, and a configuration for preventing generation of a force for twisting the tension applying spring 92 will be described below with reference to the drawings. The reinforcing bar binding machine 1A includes a prevention member 93 that prevents the generation of the force for twisting the tension applying spring 92.

The prevention member 93 has a plate shape, and has a hole portion 93*a* having a diameter slightly larger than a diameter of a portion of the sleeve 71 through which the tension applying spring 92 passes so as to penetrate the prevention member 93. The prevention member 93 is provided between the tension applying spring 92 and the rotation regulating blade 74*a* by passing the sleeve 71 between the tension applying spring 92 and the rotation regulating blade 74*a* through the hole portion 93*a*. Further, the prevention member 93 is rotatably supported with respect to the sleeve 71 between the tension applying spring 92 and the rotation regulating blade 74*a*, and is movably supported in the axial direction of the rotation shaft 72 with respect to the sleeve 71.

The prevention member 93 includes a rotation prevention unit 93*b* that engages with an arm portion 63. The arm portion 63 has a plate shape and extends in the front-rear direction, which is the moving direction of the sleeve 71 indicated by the arrows A1 and A2. A side of the arm portion 63 facing the sleeve 71 is parallel to the axial direction of the rotation shaft 72. In the present example, the arm portion 63 is provided to attach the cutting unit 6A to the main body portion 10A, and the fixed blade unit 60 and the shaft 62*a* are attached to the arm portion 63. The movable blade unit 61 is rotatably supported by the fixed blade unit 60, and the first link 62*b* is rotatably supported by the shaft 62*a*.

The rotation prevention unit 93*b* is implemented by a groove opened with a width slightly larger than a plate thickness of the arm portion 63, and when the prevention member 93 is supported by the sleeve 71, the rotation prevention unit 93*b* engages with the arm portion 63 in a state where the arm portion 63 is inserted into the groove.

Accordingly, the prevention member 93 is movably supported in the front-rear direction along the axial direction of the rotation shaft 72 with respect to the sleeve 71 in a state where the rotation following the rotation of the sleeve 71 and the rotation regulating blade 74*a* is prevented, and moves in the front-rear direction in conjunction with the movement of the sleeve 71 and the rotation regulating blade 74*a* in the front-rear direction.

When the sleeve 71 moves in the forward direction indicated by the arrow A1, the prevention member 93 is pressed by the rotation regulating blade 74*a* and moves in a direction approaching the support member 76*d* while receiving a force pressed against the rotation regulating blade 74*a* by the tension applying spring 92. When the sleeve 71 rotates, the prevention member 93 is pressed by the rotation regulating blade 74*a* and receives a force in the rotation direction while receiving the force pressed against the rotation regulating blade 74*a* by the tension applying spring 92.

However, since the rotation prevention unit 93*b* is engaged with the arm portion 63, the prevention member 93 moves in the direction approaching the support member 76*d* in a state where the rotation following the rotation of the sleeve 71 and the rotation regulating blade 74*a* is prevented.

A front end side, which is one end portion, of the tension applying spring 92 faces the support member 76*d*. At least a part of the support member 76*d* includes a portion that is not rotated with respect to the main body portion 10A, and the front end side of the tension applying spring 92 is pressed against the portion that is not rotated with respect to the main body portion 10A in the support member 76*d*. In the present example, the support member 76*d* is implemented by a bearing having an integral structure, and is fitted to the main body portion 10A. The entire support member 76*d* does not rotate with respect to the main body portion 10A.

A rear end side, which is the other end portion, of the tension applying spring 92 faces the prevention member 93. The rear end side of the tension applying spring 92 is pressed against the prevention member 93. At least a portion of the prevention member 93, which is pressed by the tension applying spring 92, is prevented from rotating following the rotation of the sleeve 71. In the present example, as described above, the entire prevention member 93 does not rotate with respect to the main body portion 10A, and the rotation following the rotation of the sleeve 71 is prevented.

Figure 5A:
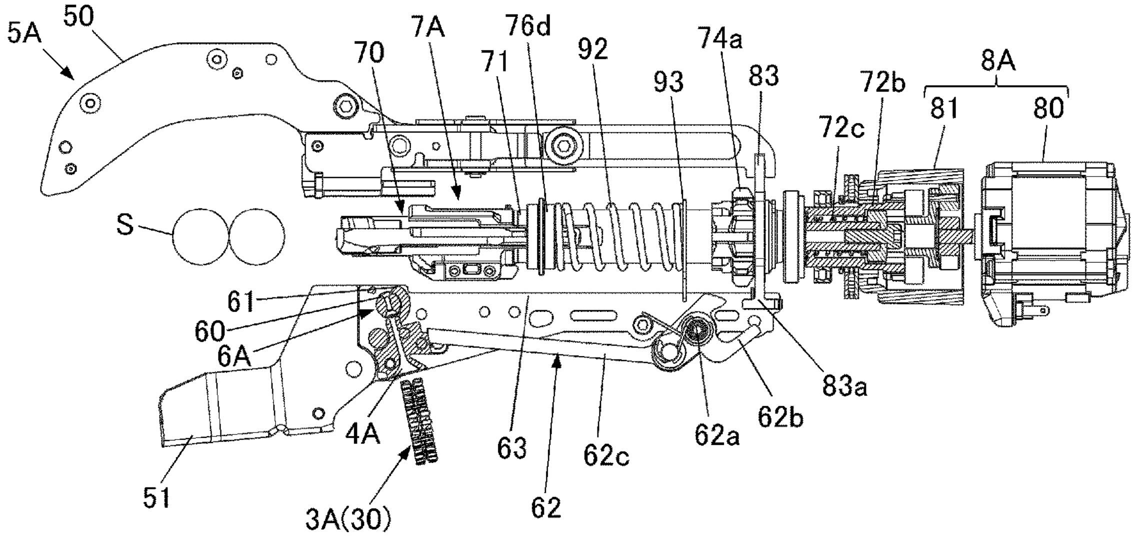
FIG. 5A is a main part side sectional view illustrating an example of an operation of the reinforcing bar binding machine according to the first embodiment.
Figure 5B:
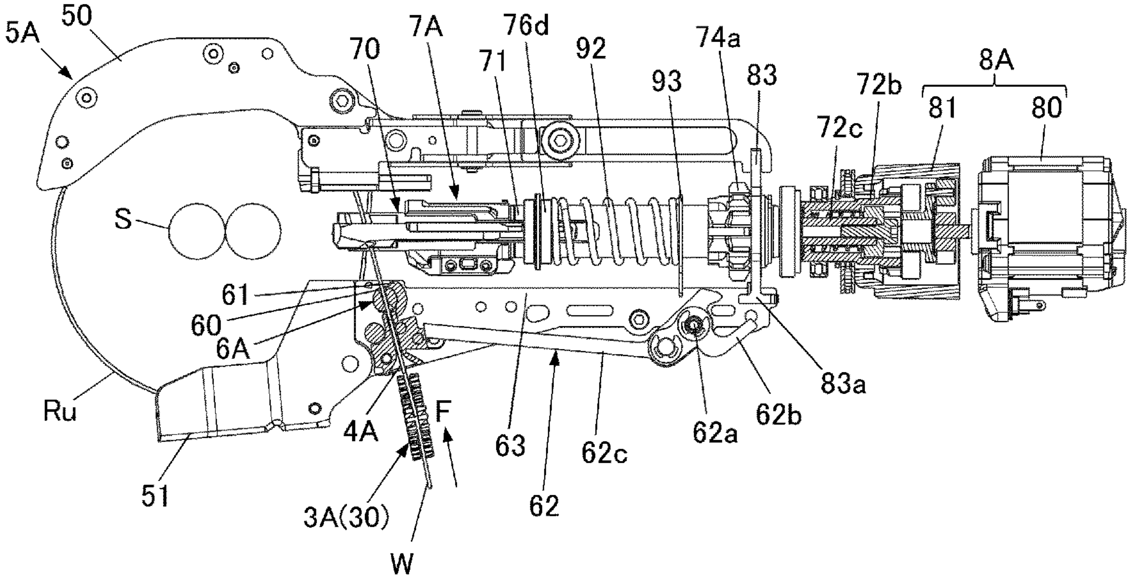
FIG. 5B is a main part side sectional view illustrating an example of the operation of the reinforcing bar binding machine according to the first embodiment.
Figure 5C:
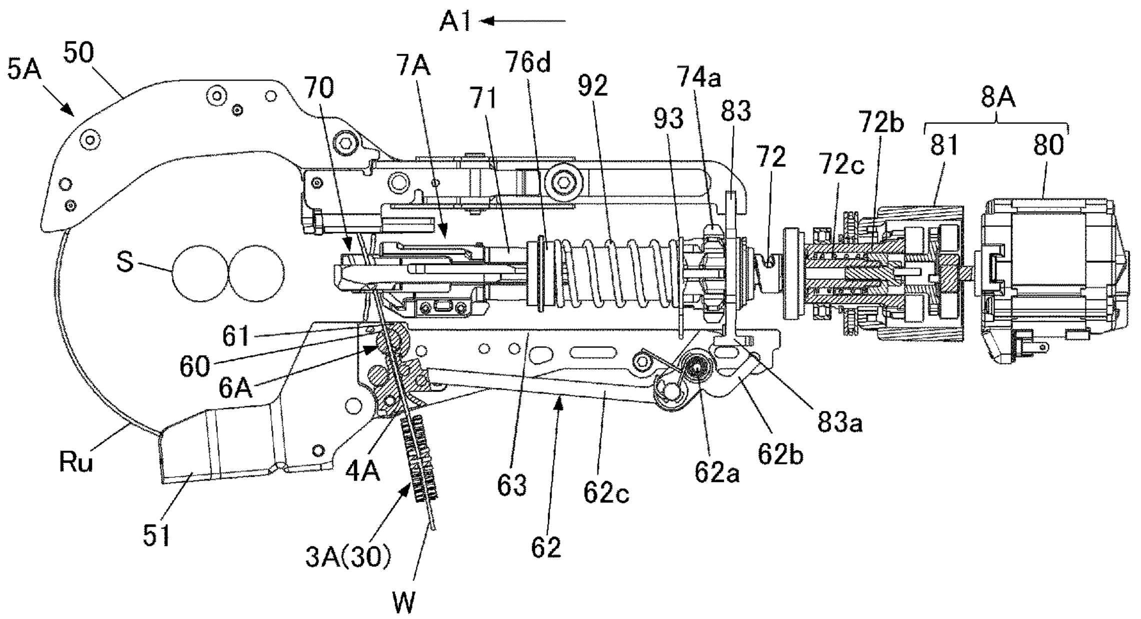
FIG. 5C is a main part side sectional view illustrating an example of the operation of the reinforcing bar binding machine according to the first embodiment.
Figure 5D:
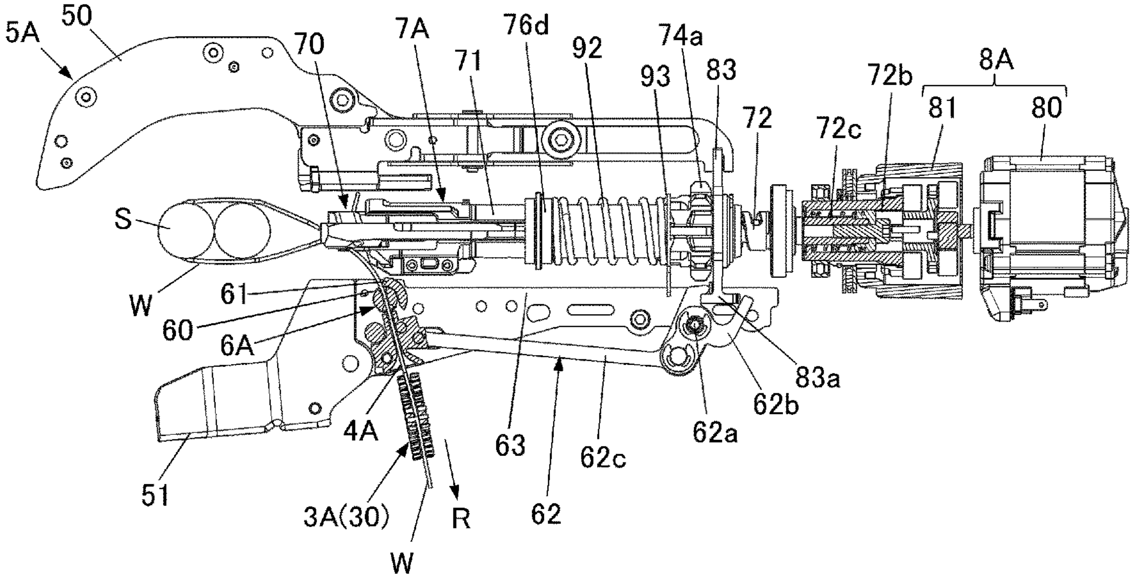
FIG. 5D is a main part side sectional view illustrating an example of the operation of the reinforcing bar binding machine according to the first embodiment.
Figure 5E:
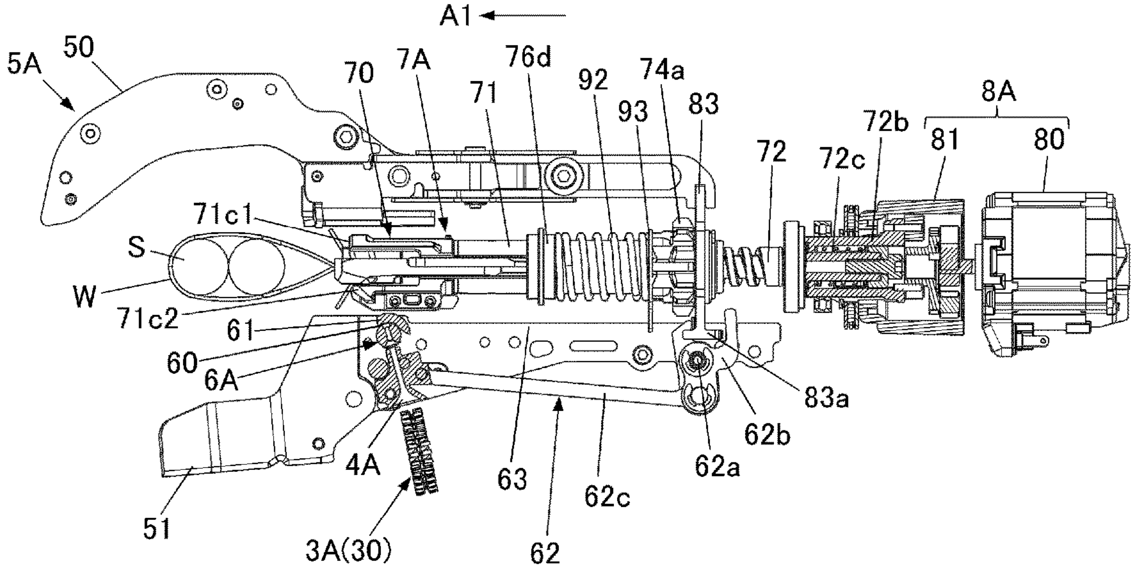
FIG. 5E is a main part side sectional view illustrating an example of the operation of the reinforcing bar binding machine according to the first embodiment.
Figure 5F:
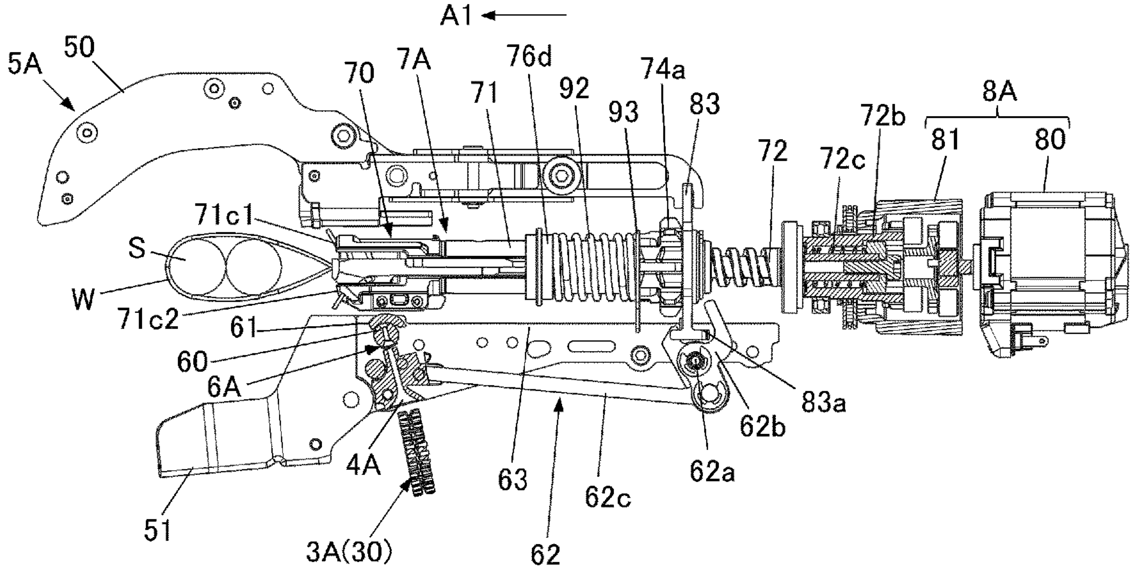
FIG. 5F is a main part side sectional view illustrating an example of the operation of the reinforcing bar binding machine according to the first embodiment.
Figure 5G:
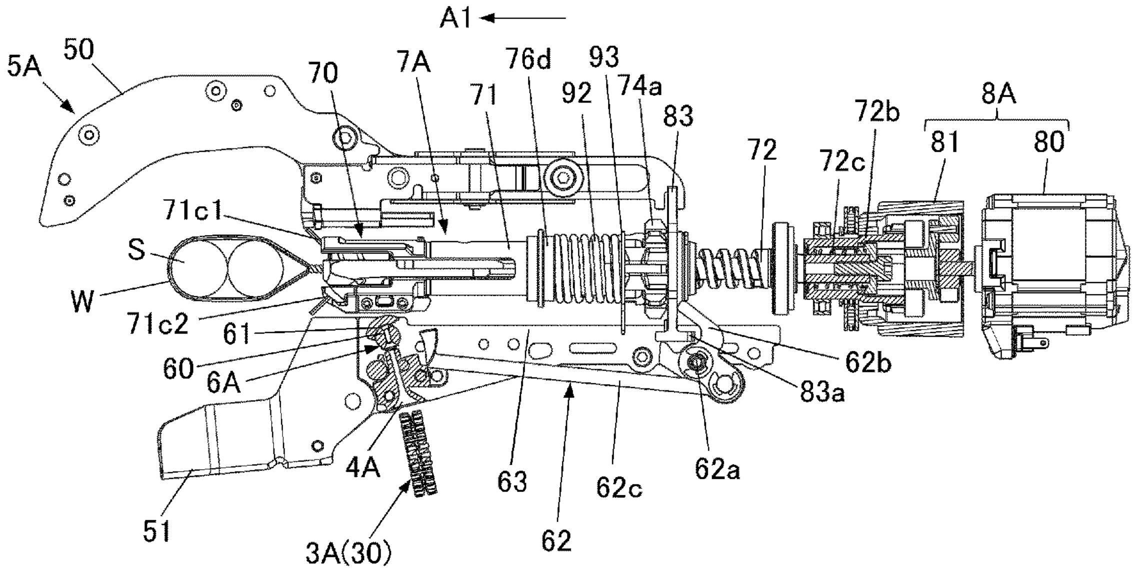
FIG. 5G is a main part side sectional view illustrating an example of the operation of the reinforcing bar binding machine according to the first embodiment.
Figure 5H:
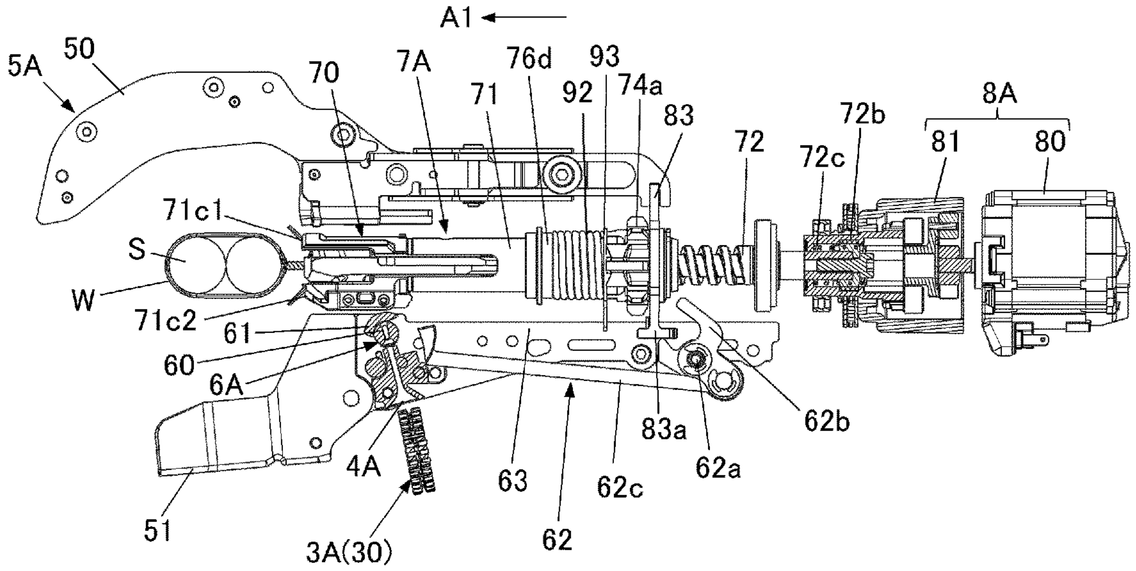
FIG. 5H is a main part side sectional view illustrating an example of the operation of the reinforcing bar binding machine according to the first embodiment.

Operation Example of Reinforcing Bar Binding Machine According to First Embodiment FIGS. 5A, 5B, 5C, 5D, 5E, 5F, 5G, and 5H are main part side sectional views illustrating examples of operations of the reinforcing bar binding machine according to the first embodiment. FIG. 5A shows a state where the reinforcing bars S are placed at a position where they can be bound. FIG. 5B illustrates an operation of feeding the wire W in the forward direction and winding the wire W around the reinforcing bars S. FIG. 5C illustrates an operation of locking the wire W wound around the reinforcing bars S. FIG. 5D illustrates an operation of feeding the wire W in the reverse direction and winding the wire W around the reinforcing bars S. FIG. 5E illustrates an operation of cutting a surplus portion of the wire W wound around the reinforcing bars S. FIG. 5F illustrates an operation of bending the wire W wound around the reinforcing bars S. FIGS. 5G and 5H illustrate an operation of twisting the wire W wound around the reinforcing bars S.

Next, an operation of binding the reinforcing bars S with the wire W by the reinforcing bar binding machine 1A according to the first embodiment will be described with reference to the drawings.

In the reinforcing bar binding machine 1A, a state where the wire W is held between the pair of feeding gears 30 and the distal end of the wire W is located between a holding position of the feeding gears 30 and the fixed blade unit 60 of the cutting unit 6A is a standby state. In the reinforcing bar binding machine 1A, in the standby state, the sleeve 71 and the wire locking body 70 in which the first side hook 70L, the second side hook 70R, and the center hook 70C are attached to the sleeve 71 move in the rearward direction indicated by the arrow A2, and as illustrated in FIG. 3B and the like, the first side hook 70L is opened with respect to the center hook 70C and the second side hook 70R is opened with respect to the center hook 70C. Further, in the reinforcing bar binding machine 1A, in the standby state, the rotation regulating blade 74*a* is separated from the tension applying spring 92, and the sleeve 71 and the wire locking body 70 are not biased rearward by the tension applying spring 92.

As illustrated in FIG. 5A, the reinforcing bars S are inserted between the curl guide 50 and the leading guide 51 of the curl forming unit 5A. When the trigger 12A is operated, the feeding motor (not illustrated) is driven in a forward rotation direction, and as illustrated in FIG. 5B, the wire W is fed in the forward direction indicated by the arrow F by the wire feeding unit 3A.

When the plurality of, for example, 2 wires W are fed, the 2 wires W are fed by the wire guide 4A in a state of being arranged in parallel along an axial direction of the loop Ru formed by the wires W.

The wire W fed in the forward direction passes between the center hook 70C and the first side hook 70L and is fed to the curl guide 50 of the curl forming unit 5A. The wire W is wound around the reinforcing bars S by passing through the curl guide 50.

The wire W wound by the curl guide 50 is led by the leading guide 51 and further fed in the forward direction by the wire feeding unit 3A, and then is led between the center hook 70C and the second side hook 70R by the leading guide 51. Then, the wire W is fed until the distal end thereof abuts against the feed regulating unit 90. When the distal end of the wire W is fed to a position where the distal end of the wire W abuts against the feed regulating unit 90, the driving of the feeding motor (not illustrated) is stopped.

After the feeding of the wire W in the forward direction is stopped, the motor 80 is driven in the forward rotation direction. For the sleeve 71, in the first operation range in which the wire W is locked by the wire locking body 70, the rotation of the sleeve 71 in conjunction with the rotation of the rotation shaft 72 is regulated by locking the rotation regulating blade 74*a* to the rotation regulating pawl 74*b*. Accordingly, as illustrated in FIG. 5C, the rotation of the motor 80 is converted into linear movement, and the sleeve 71 moves in the direction indicated by the arrow A1, which is the forward direction.

When the sleeve 71 moves in the forward direction, the opening and closing pin 71*a* passes through the opening and closing guide hole 73. Accordingly, the first side hook 70L moves in the direction approaching the center hook 70C by a rotation operation with the shaft 71*b* as a fulcrum. When the first side hook 70L is closed with respect to the center hook 70C, the wire W sandwiched between the first side hook 70L and the center hook 70C is locked in a form movable between the first side hook 70L and the center hook 70C.

Further, the second side hook 70R moves in the direction approaching the center hook 70C by the rotation operation with the shaft 71*b* as a fulcrum. When the second side hook 70R is closed with respect to the center hook 70C, the wire W sandwiched between the second side hook 70R and the center hook 70C is locked so as not to come off from between the second side hook 70R and the center hook 70C. In the reinforcing bar binding machine 1A, in the first operation range in which the wire W is locked by the wire locking body 70, the sleeve 71 and the wire locking body 70 are not biased rearward by the tension applying spring 92, and a burden due to the tension applying spring 92 is not applied by an operation in which the sleeve 71 and the wire locking body 70 move in the direction indicated by the arrow A1, which is the forward direction.

After the sleeve 71 is advanced to a position where the wire W is locked by an operation of closing the first side hook 70L and the second side hook 70R, the rotation of the motor 80 is temporarily stopped, and the feeding motor (not illustrated) is driven in a reverse rotation direction.

Accordingly, the pair of feeding gears 30 rotate in a reverse direction, and as illustrated in FIG. 5D, the wire W held between the pair of feeding gears 30 is fed in the reverse direction indicated by the arrow R. Since the distal end side of the wire W is locked so as not to come off between the second side hook 70R and the center hook 70C, the wire W is wound around the reinforcing bars S by an operation of feeding the wire W in the reverse direction.

After the wire W is wound around the reinforcing bars S and the driving of the feeding motor (not illustrated) in the reverse rotation direction is stopped, the motor 80 is driven in the forward rotation direction to further move the sleeve 71 in the forward direction indicated by the arrow A1. As illustrated in FIG. 5E, the operation in which the sleeve 71 moves in the forward direction is transmitted to the cutting unit 6A by the transmission mechanism 62, and then the movable blade unit 61 rotates. The wire W locked by the first side hook 70L and the center hook 70C is cut by operations of the fixed blade unit 60 and the movable blade unit 61. In the reinforcing bar binding machine 1A, in the second operation range in which the sleeve 71 and the wire locking body 70 are moved in the forward direction to cut the wire W, the rotation regulating blade 74*a* comes into contact with the tension applying spring 92 via the prevention member 93, the tension applying spring 92 is compressed between the support member 76*d* and the rotation regulating blade 74*a*, and the sleeve 71 and the wire locking body 70 are biased rearward by the tension applying spring 92.

When the wire W is cut, a load applied to the movable blade unit 61 disappears. The movable blade unit 61 is connected to the sleeve 71 via the second link 62*c* and the first link 62*b* of the transmission mechanism 62 and the transmission member 83. Accordingly, when the load applied to the movable blade unit 61 disappears, a force for regulating the movement of the sleeve 71 is reduced by the load applied to the movable blade unit 61.

In the operation of winding the wire W around the reinforcing bars S described above, since the distal end side of the wire W is locked so as not to come off between the second side hook 70R and the center hook 70C, the tension applied to the wire W increases. Accordingly, a force for moving the sleeve 71 in a forward direction is applied to the sleeve 71 by the reaction force of the tension applied to the wire W. Therefore, when the wire W is cut and the load applied to the movable blade unit 61 disappears, and the force for regulating the movement of the sleeve 71 is reduced by the load applied to the movable blade unit 61, the sleeve 71 is moved in the forward direction.

When the sleeve 71 moves in the forward direction, a force for pulling the wire W, which is locked by the wire locking body 70 in which the center hook 70C, the first side hook 70L, and the second side hook 70R are attached to the sleeve 71, in the rearward direction is reduced, and the wire W wound around the reinforcing bars S is loosened before being twisted.

In contrast, in the present embodiment, in the second operation range in which the wire W is cut, the sleeve 71 is biased in the rearward direction by the tension applying spring 92 compressed between the support member 76*d* and the rotation regulating blade 74*a* by the operation in which the sleeve 71 moves in the forward direction. Since the compressed tension applying spring 92 is extended, a force for biasing the sleeve 71 rearward is larger than the reaction force of the tension applied to the wire W by being wound around the reinforcing bars S. Therefore, even when the wire W is cut and the load applied to the movable blade unit 61 disappears, and the force for regulating the movement of the sleeve 71 is reduced by the load applied to the movable blade unit 61, the movement of the sleeve 71 in the forward direction is prevented.

By preventing the movement of the sleeve 71 in the forward direction, the force for pulling the wire W locked by the wire locking body 70 rearward is prevented from being reduced. Accordingly, the tension applied to the wire W is maintained by the operation of feeding the wire W in the reverse direction and winding the wire W around the reinforcing bars S, and the wire W wound around the reinforcing bars S is prevented from being loosened before being twisted. The tension applying spring 92 is configured such that the coil spring is provided on the outer periphery of the sleeve 71, and therefore a restriction of a diameter and the like of the spring is small, and a biasing force can be improved.

As described above, in the reinforcing bar binding machine 1A, in the second operation range in which the wire W is cut, the sleeve 71 and the wire locking body 70 are biased in the rearward direction by the tension applying spring 92, and therefore the movement of the sleeve 71 in the forward direction can be prevented. On the other hand, when the sleeve 71 and the wire locking body 70 are biased rearward by the tension applying spring 92 in the first operation range in which the wire W is locked by the wire locking body 70, a burden applied to the motor 80 increases.

As described above, in the reinforcing bar binding machine 1A, the rotation regulating blade 74*a* is separated from the tension applying spring 92 in the standby state, and the sleeve 71 and the wire locking body 70 are not biased rearward by the tension applying spring 92 in the first operation range in which the wire W is locked by the wire locking body 70. Accordingly, in the first operation range in which the wire W is locked by the wire locking body 70, the burden due to a load caused by the tension applying spring 92 biasing the sleeve 71 and the wire locking body 70 in the rearward direction is not applied by the operation of moving the sleeve 71 and the wire locking body 70 in the direction indicated by the arrow A1, which is the forward direction. Accordingly, an increase in the burden applied to the motor 80 in a region where the load caused by the tension applying spring 92 is unnecessary.

The rotation shaft 72 is connected to the speed reducer 81 via the connecting unit 72*b* rotatable integrally with the speed reducer 81 and movable in the axial direction with respect to the speed reducer 81. In the first operation range in which the wire W is locked by the wire locking body 70 from a standby position, since the sleeve 71 and the wire locking body 70 are not biased rearward by the tension applying spring 92, a position of the rotation shaft 72 in the axial direction cannot be regulated by the tension applying spring 92 in the first operation range. Therefore, the connecting unit 72*b* includes the spring 72*c* which biases the rotation shaft 72 rearward, which is the direction approaching the speed reducer 81. Accordingly, the position of the rotation shaft 72 is regulated by receiving the force for pushing by the spring 72*c* rearward if there is no force for moving in the forward direction beyond the biasing force applied by the spring 72*c*.

Accordingly, by providing the tension applying spring 92 independently of the spring 72*c*, a load necessary for preventing the loosening of the wire W can be applied in a desired region, and in the second operation range in which the wire W is cut, since the sleeve 71 and the wire locking body 70 can be biased rearward by the tension applying spring 92, an effect of capable of preventing the wire W wound around the reinforcing bars S from being loosened before being twisted is obtained. In addition to this effect, by preventing an increase in the burden applied to the motor 80 in a region where the load caused by the biasing of the tension applying spring 92 is unnecessary, an increase in the burden applied to the motor 80 and the like in the entire one binding cycle can be prevented, and a decrease in durability of components can be prevented. Further, by providing the spring 72*c*, the rotation shaft 72 can be prevented from moving unnecessarily in a region where the biasing force applied by the tension applying spring 92 is not applied.

When the motor 80 is driven in the forward rotation direction to move the sleeve 71 in the forward direction indicated by the arrow A1 to cut the wire W, the bending units 71*c*1 and 71*c*2 move in a direction approaching the reinforcing bars S substantially at the same time. Accordingly, as illustrated in FIG. 5F, the distal end side of the wire W locked by the center hook 70C and the second side hook 70R is pressed toward the reinforcing bar S side by the bending unit 71*c*1, and is bent toward the reinforcing bar S side with a locking position as a fulcrum. When the sleeve 71 further moves in the forward direction, the wire W locked between the second side hook 70R and the center hook 70C is held in a state of being squeezed by the bending unit 71*c*1.

Further, the tail end side of the wire W locked by the center hook 70C and the first side hook 70L and cut at the cutting unit 6A is pressed to the reinforcing bar S side by the bending unit 71*c*2, and is bent to the reinforcing bar S side with the locking position as a fulcrum. When the sleeve 71 further moves in the forward direction, the wire W locked between the first side hook 70L and the center hook 70C is held in a state of being squeezed by the bending unit 71*c*2.

In the third operation range in which the wire W is bent and formed, the rotation regulating blade 74*a* is locked to the rotation regulating pawl 74*b*. The sleeve 71 moves in the forward direction without rotating.

After the distal end side and the tail end side of the wire W are bent toward the reinforcing bar S side, the motor 80 is further driven in the forward rotation direction, whereby the sleeve 71 further moves in the forward direction. When the sleeve 71 moves to a predetermined position and reaches the fourth operation range in which the wire W locked by the wire locking body 70 is twisted, the locking of the rotation regulating blade 74*a* to the rotation regulating pawl 74*b* is released.

Accordingly, when the motor 80 is further driven in the forward rotation direction, the sleeve 71 rotates in conjunction with the rotation shaft 72, and the wire W locked by the wire locking body 70 is twisted.

In the fourth operation range in which the sleeve 71 rotates to twist the wire W, the binding unit 7A receives a force for pulling the wire locking body 70 forward along the axial direction of the rotation shaft 72 by twisting the wire W locked by the wire locking body 70. When the sleeve 71 moves in the forward direction to a position where the sleeve 71 is rotatable, the tension applying spring 92 is further compressed, and the sleeve 71 receives a force for pushing by the tension applying spring 92 in the rearward direction.

Accordingly, when a force for moving forward along the axial direction is applied to the wire locking body 70, as illustrated in FIG. 5G, the sleeve 71 of the wire locking body 70 receives a force for pushing by the tension applying spring 92 rearward. At the same time, the rotation shaft 72 moves forward while receiving the force for pushing by the spring 72*c* rearward, and the wire W is twisted while the rotation shaft 72 moves forward.

Accordingly, a portion of the wire W locked by the wire locking body 70 is pulled rearward, the tension is applied in a tangential direction of the reinforcing bars S, and the wire W is pulled so as to be in close contact with the reinforcing bars S. In the binding unit 7A, in the fourth operation range in which the sleeve 71 rotates to twist the wire W, when the wire locking body 70 further rotates in conjunction with the rotation shaft 72, the wire W is further twisted while the wire locking body 70 and the rotation shaft 72 move in the forward direction which is a direction in which a gap between the twisted portion of the wire W and the reinforcing bars S decreases.

Accordingly, as illustrated in FIG. 5H, the wire W is twisted while the wire locking body 70 and the rotation shaft 72 move forward in a state of receiving the force for pushing rearward by the tension applying spring 92 and the spring 72*c*. Therefore, the gap between the twisted portion of the wire W and the reinforcing bars S decreases, and the wire W is brought into close contact with the reinforcing bars S along the reinforcing bars S. Accordingly, slack before the wire W is twisted can be removed, and the bounding can be performed in a state in which the wire W is in close contact with the reinforcing bars S.

When it is detected that the burden applied to the motor 80 is maximized by twisting the wire W, the forward rotation of the motor 80 is stopped. Next, when the motor 80 is driven in the reverse rotation direction, the rotation shaft 72 rotates in the reverse direction, and the sleeve 71 rotates in the reverse direction following the reverse rotation of the rotation shaft 72. The rotation of the sleeve 71 in conjunction with the rotation of the rotation shaft 72 is regulated by the rotation regulating blade 74*a* being locked by the rotation regulating pawl 74*b*. Accordingly, the sleeve 71 moves in the direction indicated by the arrow A2, which is the rearward direction.

When the sleeve 71 moves in the rearward direction, the bending units 71*c*1 and 71*c*2 separate from the wire W, and the wire W is released from being held by the bending units 71*c*1 and 71*c*2. Further, when the sleeve 71 moves in the rearward direction, the opening and closing pin 71*a* passes through the opening and closing guide hole 73. Accordingly, the first side hook 70L moves in the direction away from the center hook 70C by the rotation operation with the shaft 71*b* as a fulcrum. The second side hook 70R moves in the direction away from the center hook 70C by the rotation operation with the shaft 71*b* as a fulcrum. Accordingly, the wire W is removed from the wire locking body 70.

Example of Operation and Effect of Reinforcing Bar Binding Machine According to First Embodiment As described above, by an operation in which the tension applying spring 92 is compressed when the sleeve 71 moves in the forward direction as indicated by the arrow A1, the front end side, which is one end portion, of the tension applying spring 92 is pressed against the support member 76*d* supporting the sleeve 71. The support member 76*d* is fitted to the main body portion 10A, and does not rotate even when the sleeve 71 rotates. Accordingly, even when the sleeve 71 rotates after moving in the forward direction, a force for rotating the distal end side of the tension applying spring 92 is not applied to the tension applying spring 92.

A configuration in which the prevention member 93 is not provided and the rear end side of the tension applying spring 92, which is the other end portion of the tension applying spring 92, is in direct contact with the rotation regulating blade 74*a*, or a configuration in which the rear end side of tension applying spring 92 is in contact with a member that rotates following the sleeve 71 and the rotation regulating blade 74*a* is considered. In such a configuration, when the sleeve 71 and the rotation regulating blade 74*a* rotate, the rear end side of the tension applying spring 92 rotates following the rotation of the sleeve 71 and the rotation regulating blade 74*a*, thereby generating a force for twisting the tension applying spring 92.

In contrast, in the configuration including the prevention member 93, when the sleeve 71 moves in the forward direction indicated by the arrow A1, the rotation regulating blade 74*a* moving in the forward direction together with the sleeve 71 comes into contact with the prevention member 93. When the sleeve 71 and the rotation regulating blade 74*a* further move in the forward direction, the prevention member 93 is pressed against the tension applying spring 92, and the prevention member 93 is sandwiched between the tension applying spring 92 and the rotation regulating blade 74*a*. The tension applying spring 92 is compressed between the support member 76*d* supporting the sleeve 71 and the rotation regulating blade 74*a* via the prevention member 93.

When the sleeve 71 rotates in a state where the prevention member 93 is sandwiched between the tension applying spring 92 and the rotation regulating blade 74*a*, the prevention member 93 is pressed against the rotation regulating blade 74*a* by a force for extending the compressed tension applying spring 92, and thus a force for rotating the prevention member 93 by the rotation regulating blade 74*a* that rotates together with the sleeve 71 is applied to the prevention member 93.

However, since the rotation prevention unit 93*b* is engaged with the arm portion 63 to regulate the rotation, the prevention member 93 does not rotate following the sleeve 71 and the rotation regulating blade 74*a*.

The rear end side of the tension applying spring 92 is pressed against the prevention member 93 by a force for extending the compressed tension applying spring 92, but since the prevention member 93 does not rotate following the sleeve 71 and the rotation regulating blade 74*a*, a force for rotating the rear end side of the tension applying spring 92 is not applied to the tension applying spring 92 even when the sleeve 71 and the rotation regulating blade 74*a* rotate. Accordingly, even when the sleeve 71 rotates after moving in the forward direction, the generation of the force for twisting the tension applying spring 92 is prevented, and a burden in a direction other than a direction in which the tension applying spring 92 is compressed and extended is prevented from being applied to the tension applying spring 92 which is a coil spring. Accordingly, durability of the tension applying spring 92 can be improved.

Figure 6:
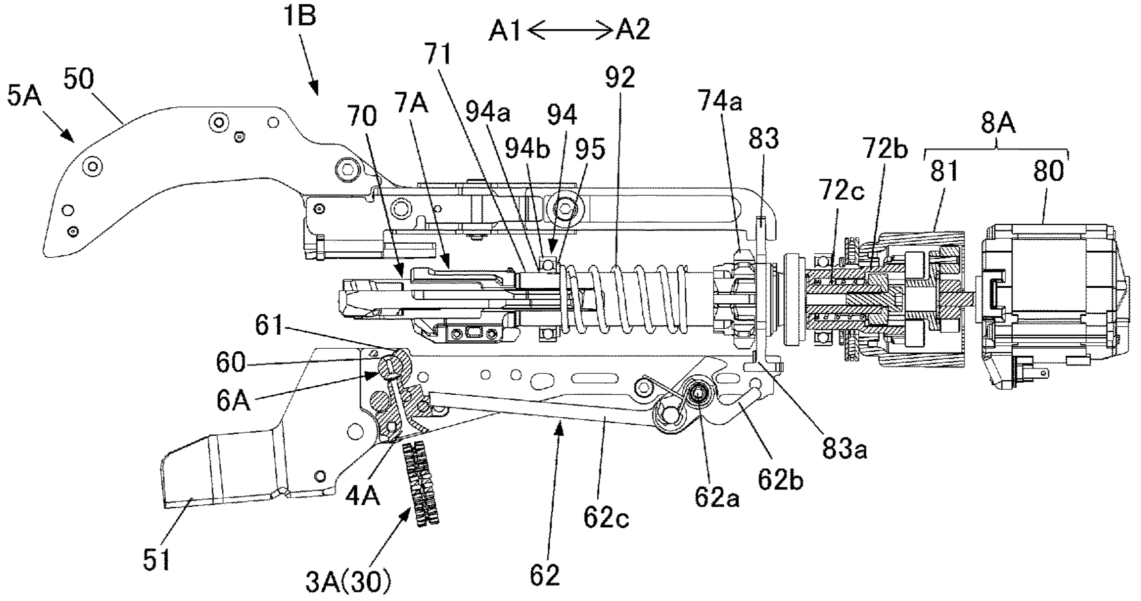
FIG. 6 is a partial side sectional view illustrating an example of a main part configuration of a reinforcing bar binding machine according to a second embodiment.

Configuration Example of Reinforcing Bar Binding Machine According to Second Embodiment FIG. 6 is a partial side sectional view illustrating an example of a main part configuration of a reinforcing bar binding machine according to a second embodiment. An overall configuration of a reinforcing bar binding machine 1B according to the second embodiment is the same as that of the reinforcing bar binding machine 1A according to the first embodiment. The same components as those of the reinforcing bar binding machine 1A according to the first embodiment are denoted by the same reference numerals, and detailed descriptions thereof will be omitted.

The reinforcing bar binding machine 1B according to the second embodiment includes a prevention member 94 that prevents generation of a force for twisting the tension applying spring 92. The prevention member 94 is implemented by a bearing, and rotatably supports the sleeve 71 with respect to the main body portion 10A on a front end side, which is one end portion, of the tension applying spring 92. In the prevention member 94, an inner ring portion 94*a* of the bearing supporting the sleeve 71 rotates in conjunction with the sleeve 71, and an outer ring portion 94*b* of the bearing fitted to the main body portion 10A does not rotate.

In the sleeve 71, a spacer 95 is inserted between the prevention member 94 and the tension applying spring 92. The spacer 95 has an annular shape, comes into contact with the inner ring portion 94*a* of the bearing implementing the prevention member 94, and rotates following the sleeve 71 and the inner ring portion 94*a* of the prevention member 94. The front end side of the tension applying spring 92 comes into contact with the spacer 95, and can rotate following the sleeve 71 and the inner ring portion 94*a* of the prevention member 94 via the spacer 95.

Figure 7A:
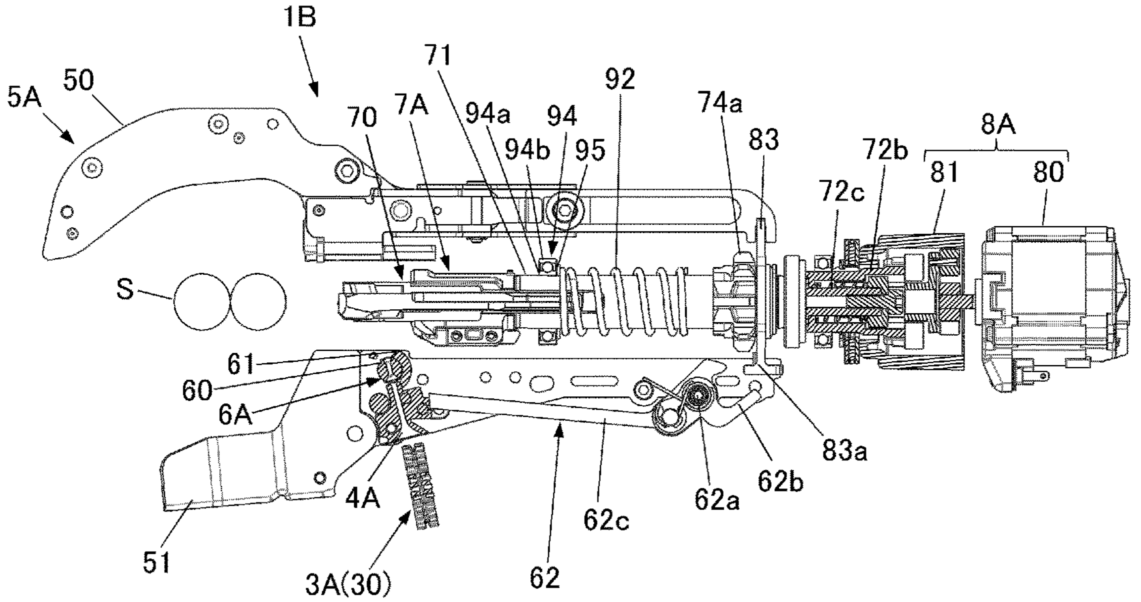
FIG. 7A is a main part side sectional view illustrating an example of an operation of the reinforcing bar binding machine according to the second embodiment.
Figure 7B:
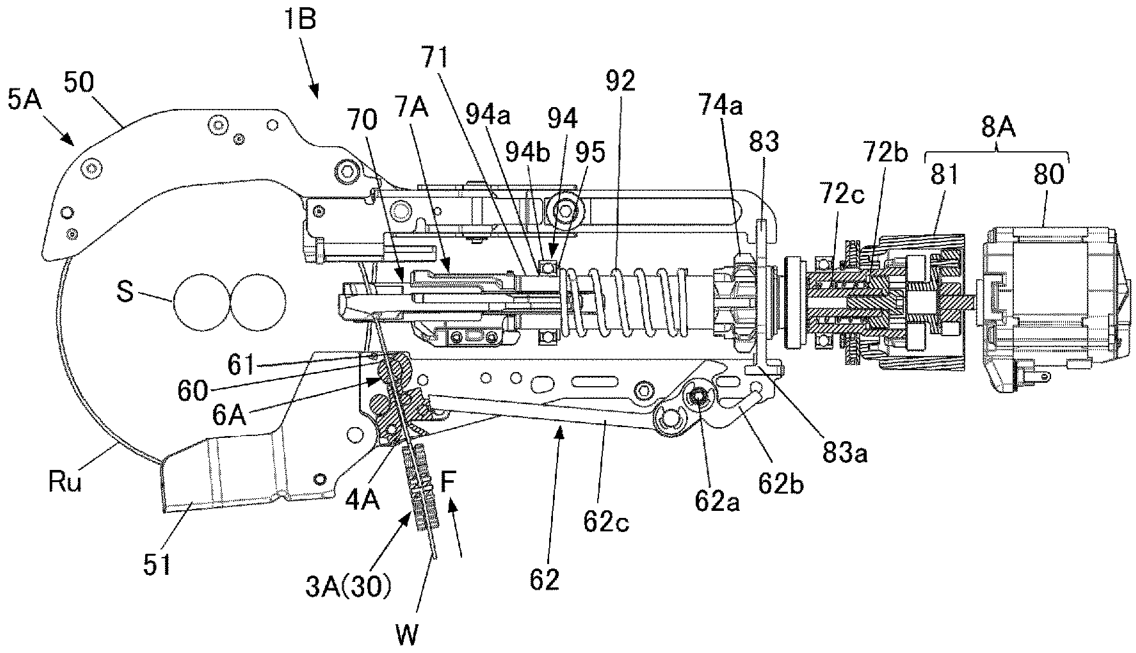
FIG. 7B is a main part side sectional view illustrating an example of the operation of the reinforcing bar binding machine according to the second embodiment.
Figure 7C:
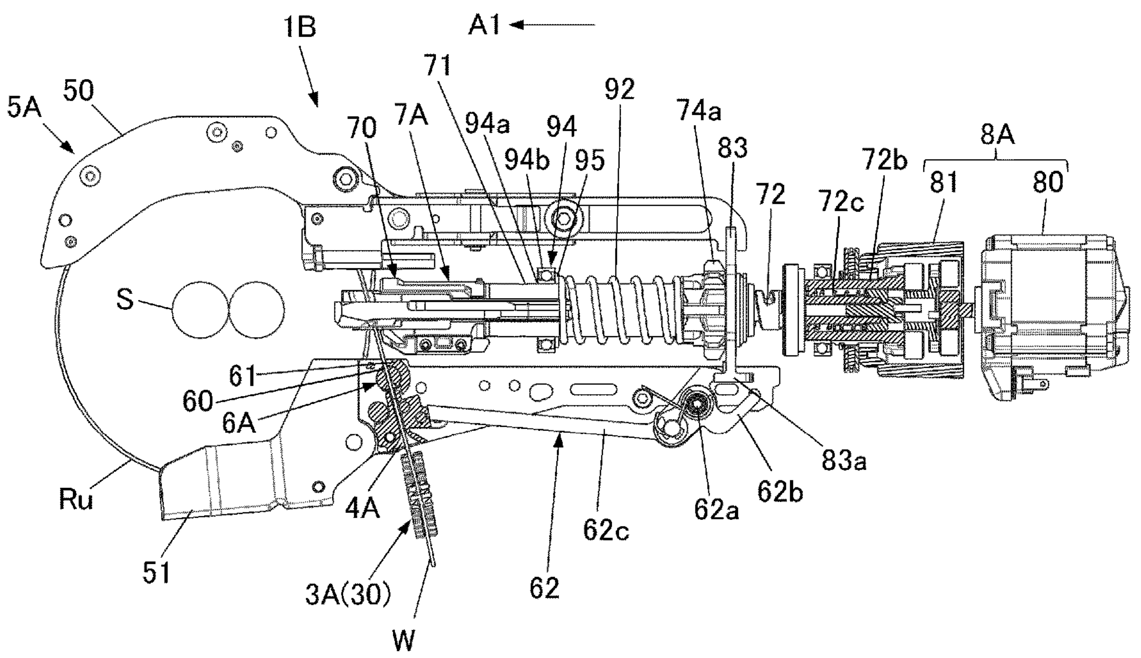
FIG. 7C is a main part side sectional view illustrating an example of the operation of the reinforcing bar binding machine according to the second embodiment.
Figure 7D:
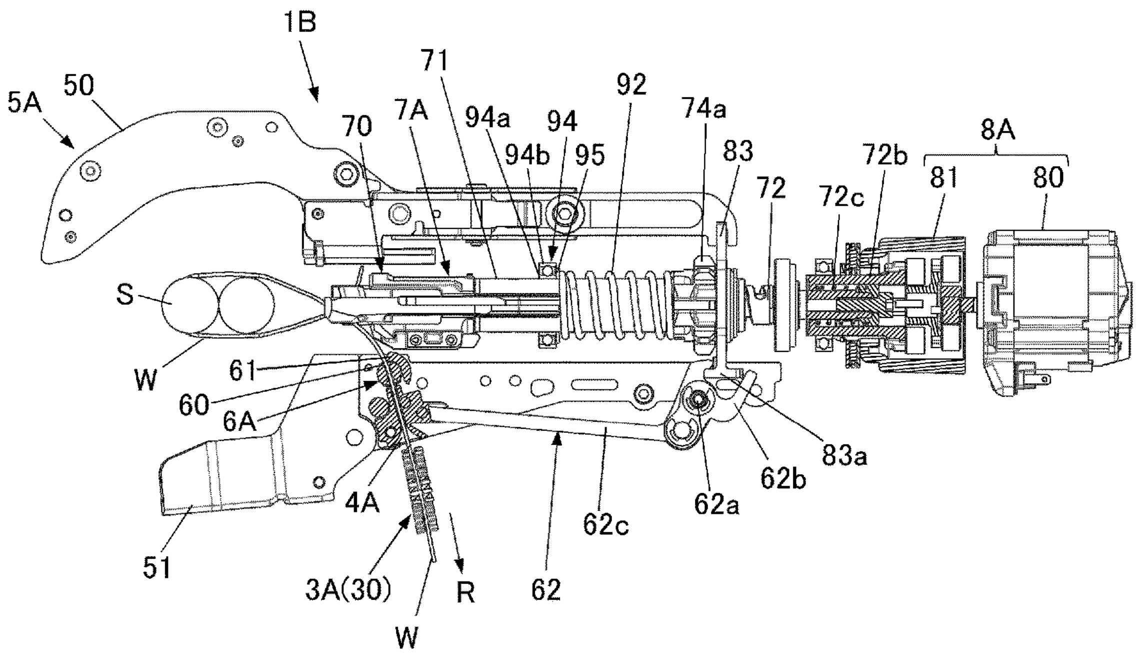
FIG. 7D is a main part side sectional view illustrating an example of the operation of the reinforcing bar binding machine according to the second embodiment.
Figure 7E:
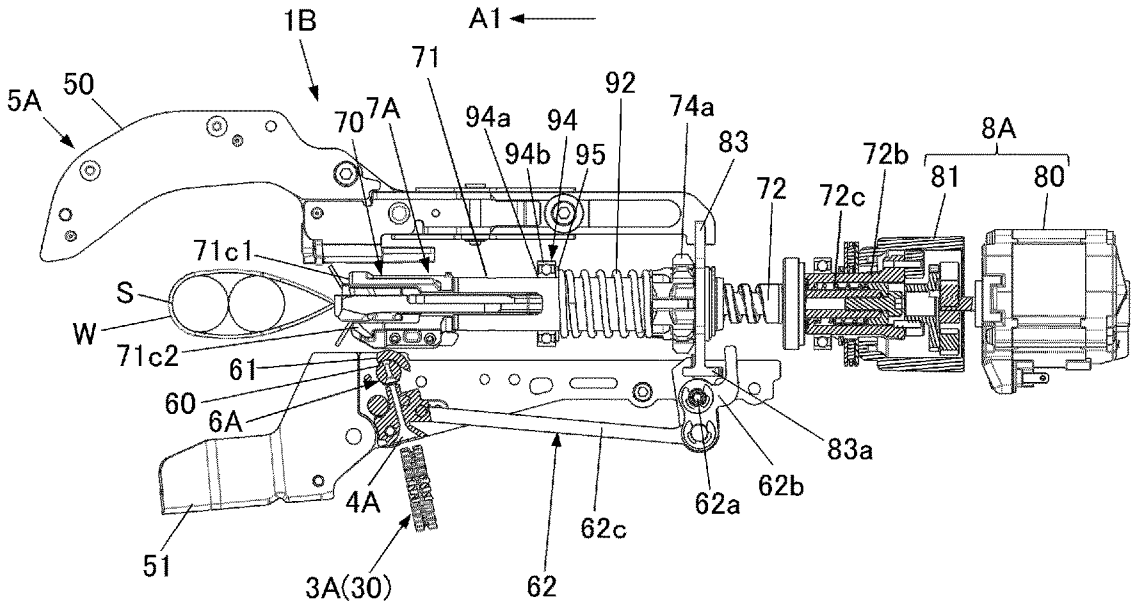
FIG. 7E is a main part side sectional view illustrating an example of the operation of the reinforcing bar binding machine according to the second embodiment.
Figure 7F:
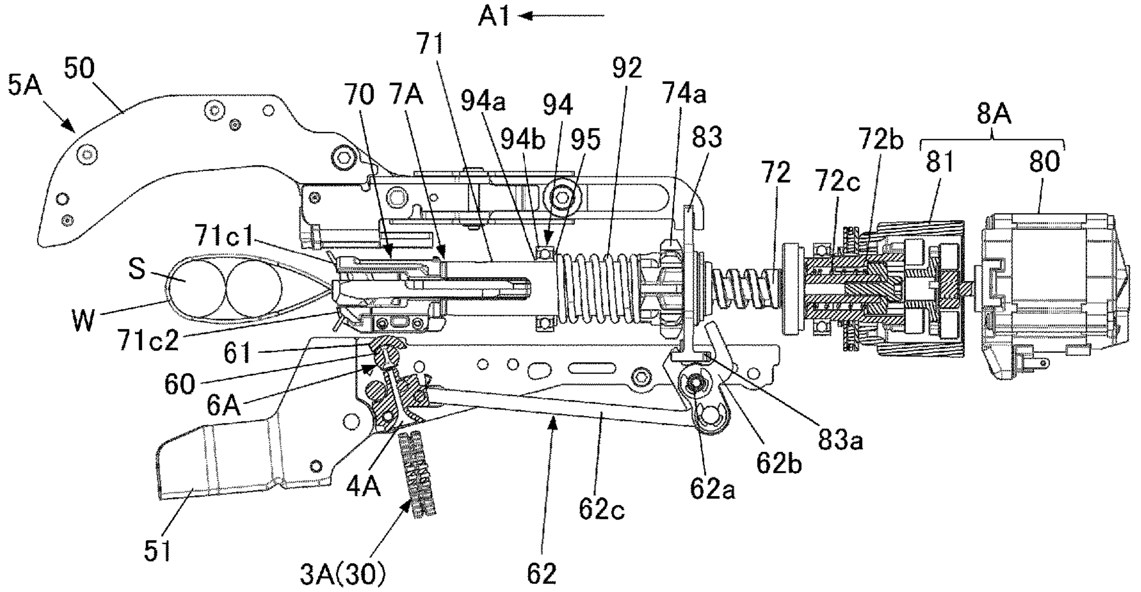
FIG. 7F is a main part side sectional view illustrating an example of the operation of the reinforcing bar binding machine according to the second embodiment.
Figure 7G:
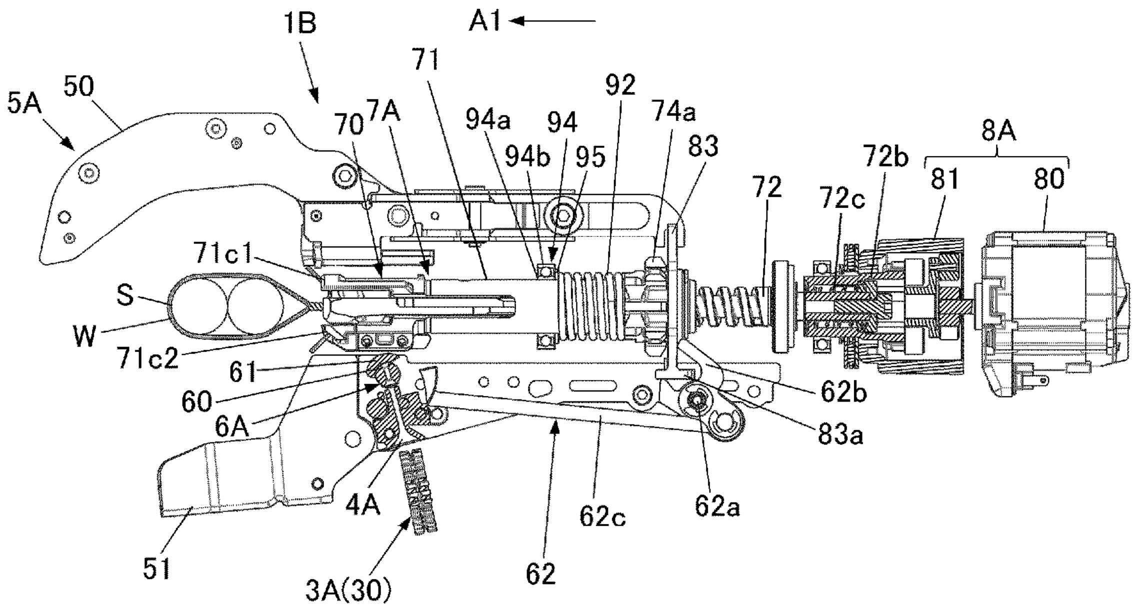
FIG. 7G is a main part side sectional view illustrating an example of the operation of the reinforcing bar binding machine according to the second embodiment.
Figure 7H:
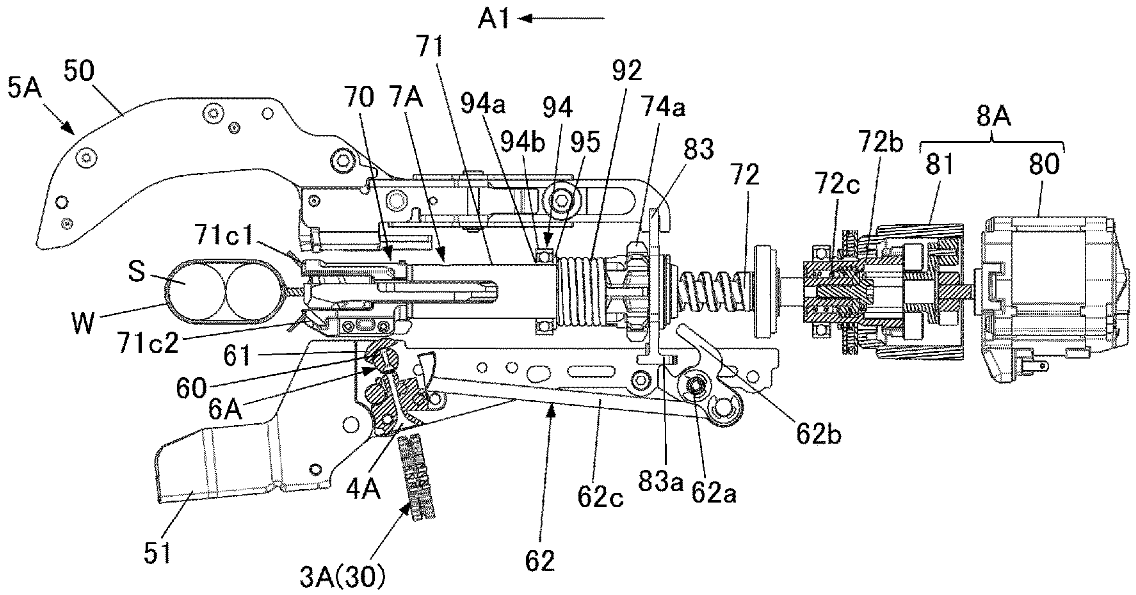
FIG. 7H is a main part side sectional view illustrating an example of the operation of the reinforcing bar binding machine according to the second embodiment.

Operation Example of Reinforcing Bar Binding Machine According to Second Embodiment FIGS. 7A, 7B, 7C, 7D, 7E, 7F, 7G, and 7H are main part side sectional views illustrating examples of operations of the reinforcing bar binding machine according to the second embodiment. FIG. 7A shows a state where the reinforcing bars S are placed at a position where they can be bound. FIG. 7B illustrates an operation of feeding the wire W in a forward direction and winding the wire W around the reinforcing bars S. FIG. 7C illustrates an operation of locking the wire W wound around the reinforcing bars S. FIG. 7D illustrates an operation of feeding the wire W in a reverse direction and winding the wire W around the reinforcing bars S. FIG. 7E illustrates an operation of cutting a surplus portion of the wire W wound around the reinforcing bars S. FIG. 7F illustrates an operation of bending the wire W wound around the reinforcing bars S. FIGS. 7G and 7H illustrate an operation of twisting the wire W wound around the reinforcing bars S.

Next, an operation of binding the reinforcing bars S with the wire W by the reinforcing bar binding machine 1B according to the second embodiment will be described with reference to the drawings.

In the reinforcing bar binding machine 1B, similarly to the reinforcing bar binding machine 1A according to the first embodiment, in a standby state, as illustrated in FIG. 7A, the reinforcing bars S are inserted between the curl guide 50 and the leading guide 51 of the curl forming unit 5A. When the trigger 12A is operated, a feeding motor (not illustrated) is driven in a forward rotation direction, and as illustrated in FIG. 7B, the wire W is fed in the forward direction indicated by the arrow F by the wire feeding unit 3A.

When 2 wires W are fed, the 2 wires W are fed by the wire guide 4A in a state of being arranged in parallel along an axial direction of the loop Ru formed by the wires W.

The wire W fed in the forward direction passes between the center hook 70C and the first side hook 70L and is fed to the curl guide 50 of the curl forming unit 5A. The wire W is wound around the reinforcing bars S by passing through the curl guide 50.

The wire W wound by the curl guide 50 is led by the leading guide 51 and further fed in the forward direction by the wire feeding unit 3A, and then is led between the center hook 70C and the second side hook 70R by the leading guide 51. Then, the wire W is fed until a distal end thereof abuts against the feed regulating unit 90. When the wire W is fed to a position where the distal end of the wire W abuts against the feed regulating unit 90, driving of the feeding motor (not illustrated) is stopped.

After the feeding of the wire W in the forward direction is stopped, the motor 80 is driven in the forward rotation direction. For the sleeve 71, in a first operation range in which the wire W is locked by the wire locking body 70, rotation of the sleeve 71 in conjunction with rotation of the rotation shaft 72 is regulated by locking the rotation regulating blade 74*a* to the rotation regulating pawl 74*b*. Accordingly, as illustrated in FIG. 7C, rotation of the motor 80 is converted into linear movement, and the sleeve 71 moves in a direction indicated by the arrow A1, which is the forward direction.

When the sleeve 71 moves in the forward direction, the opening and closing pin 71*a* passes through the opening and closing guide hole 73. Accordingly, the first side hook 70L moves in the direction approaching the center hook 70C by a rotation operation with the shaft 71*b* as a fulcrum. When the first side hook 70L is closed with respect to the center hook 70C, the wire W sandwiched between the first side hook 70L and the center hook 70C is locked in a form movable between the first side hook 70L and the center hook 70C.

Further, the second side hook 70R moves in the direction approaching the center hook 70C by the rotation operation with the shaft 71*b* as a fulcrum. When the second side hook 70R is closed with respect to the center hook 70C, the wire W sandwiched between the second side hook 70R and the center hook 70C is locked so as not to come off from between the second side hook 70R and the center hook 70C.

In the reinforcing bar binding machine 1B, in the first operation range in which the wire W is locked by the wire locking body 70, the sleeve 71 and the wire locking body 70 are not biased rearward by the tension applying spring 92, and a burden due to the tension applying spring 92 is not applied by an operation in which the sleeve 71 and the wire locking body 70 move in the direction indicated by the arrow A1, which is the forward direction.

After the sleeve 71 is advanced to a position where the wire W is locked by an operation of closing the first side hook 70L and the second side hook 70R, the rotation of the motor 80 is temporarily stopped, and the feeding motor (not illustrated) is driven in a reverse rotation direction.

Accordingly, the pair of feeding gears 30 rotate in a reverse direction, and as illustrated in FIG. 7D, the wire W held between the pair of feeding gears 30 is fed in the reverse direction indicated by the arrow R. Since a distal end side of the wire W is locked so as not to come off between the second side hook 70R and the center hook 70C, the wire W is wound around the reinforcing bars S by an operation of feeding the wire W in the reverse direction.

After the wire W is wound around the reinforcing bars S and the driving of the feeding motor (not illustrated) in the reverse rotation direction is stopped, the motor 80 is driven in the forward rotation direction to further move the sleeve 71 in the forward direction indicated by the arrow A1. As illustrated in FIG. 7E, the operation in which the sleeve 71 moves in the forward direction is transmitted to the cutting unit 6A by the transmission mechanism 62, and then the movable blade unit 61 rotates. The wire W locked by the first side hook 70L and the center hook 70C is cut by operations of the fixed blade unit 60 and the movable blade unit 61. In the reinforcing bar binding machine 1B, in the second operation range in which the sleeve 71 and the wire locking body 70 are moved in the forward direction to cut the wire W, the rotation regulating blade 74*a* comes into contact with the tension applying spring 92, the tension applying spring 92 is compressed between the prevention member 94 and the rotation regulating blade 74*a*, and the sleeve 71 and the wire locking body 70 are biased rearward by the tension applying spring 92.

In the second operation range in which the wire W is cut, the sleeve 71 is biased in the rearward direction by the tension applying spring 92 compressed between the prevention member 94 and the rotation regulating blade 74*a* by the operation in which the sleeve 71 moves in the forward direction. Therefore, by preventing the movement of the sleeve 71 in the forward direction, a force for pulling the wire W locked by the wire locking body 70 rearward is prevented from being reduced. Accordingly, a tension applied to the wire W is maintained by the operation of feeding the wire W in the reverse direction and winding the wire W around the reinforcing bars S, and the wire W wound around the reinforcing bars S is prevented from being loosened before being twisted.

When the motor 80 is driven in the forward rotation direction to move the sleeve 71 in the forward direction indicated by the arrow A1 to cut the wire W, the bending units 71*c*1 and 71*c*2 move in a direction approaching the reinforcing bars S substantially at the same time. Accordingly, as illustrated in FIG. 7F, the distal end side of the wire W locked by the center hook 70C and the second side hook 70R is pressed toward a reinforcing bar S side by the bending unit 71*c*1, and is bent toward the reinforcing bar S side with a locking position as a fulcrum. When the sleeve 71 further moves in the forward direction, the wire W locked between the second side hook 70R and the center hook 70C is held in a state of being squeezed by the bending unit 71*c*1.

Further, a tail end side of the wire W locked by the center hook 70C and the first side hook 70L and cut by the cutting unit 6A is pressed to the reinforcing bar S side by the bending unit 71*c*2, and is bent to the reinforcing bar S side with the locking position as a fulcrum. When the sleeve 71 further moves in the forward direction, the wire W locked between the first side hook 70L and the center hook 70C is held in a state of being squeezed by the bending unit 71*c*2. In the third operation range in which the wire W is bent and formed, the rotation regulating blade 74*a* is locked to the rotation regulating pawl 74*b*. The sleeve 71 moves in the forward direction without rotating.

After the distal end side and the tail end side of the wire W are bent toward the reinforcing bar S side, the motor 80 is further driven in the forward rotation direction, whereby the sleeve 71 further moves in the forward direction. When the sleeve 71 moves to a predetermined position and reaches the fourth operation range in which the wire W locked by the wire locking body 70 is twisted, the locking of the rotation regulating blade 74*a* to the rotation regulating pawl 74*b* is released.

Accordingly, when the motor 80 is further driven in the forward rotation direction, the sleeve 71 rotates in conjunction with the rotation shaft 72, and the wire W locked by the wire locking body 70 is twisted.

In the fourth operation range in which the sleeve 71 rotates to twist the wire W, the binding unit 7A receives a force for pulling the wire locking body 70 forward along an axial direction of the rotation shaft 72 by twisting the wire W locked by the wire locking body 70. When the sleeve 71 moves in the forward direction to a position where the sleeve 71 is rotatable, the tension applying spring 92 is further compressed, and the sleeve 71 receives a force for pushing by the tension applying spring 92 in the rearward direction.

Accordingly, when a force for moving forward along the axial direction is applied to the wire locking body 70, as illustrated in FIG. 7G, the sleeve 71 of the wire locking body 70 receives a force for pushing by the tension applying spring 92 rearward. At the same time, the rotation shaft 72 moves forward while receiving the force for pushing by the spring 72*c* rearward, and the wire W is twisted while the rotation shaft 72 moves forward.

Accordingly, a portion of the wire W locked by the wire locking body 70 is pulled rearward, the tension is applied in a tangential direction of the reinforcing bars S, and the wire W is pulled so as to be in close contact with the reinforcing bars S. In the binding unit 7A, in the fourth operation range in which the sleeve 71 rotates to twist the wire W, when the wire locking body 70 further rotates in conjunction with the rotation shaft 72, the wire W is further twisted while the wire locking body 70 and the rotation shaft 72 move in the forward direction which is a direction in which a gap between the twisted portion of the wire W and the reinforcing bars S decreases.

Accordingly, as illustrated in FIG. 7H, the wire W is twisted while the wire locking body 70 and the rotation shaft 72 move forward in a state of receiving the force for pushing rearward by the tension applying spring 92 and the spring 72*c*. Therefore, the gap between the twisted portion of the wire W and the reinforcing bars S decreases, and the wire W is brought into close contact with the reinforcing bars S along the reinforcing bars S. Accordingly, slack before the wire W is twisted can be removed, and the bounding can be performed in a state in which the wire W is in close contact with the reinforcing bars S.

When it is detected that the burden applied to the motor 80 is maximized by twisting the wire W, the forward rotation of the motor 80 is stopped. Next, when the motor 80 is driven in the reverse rotation direction, the rotation shaft 72 rotates in the reverse direction, and the sleeve 71 rotates in the reverse direction following the reverse rotation of the rotation shaft 72. The rotation of the sleeve 71 in conjunction with the rotation of the rotation shaft 72 is regulated by the rotation regulating blade 74*a* being locked by the rotation regulating pawl 74*b*. Accordingly, the sleeve 71 moves in the direction indicated by the arrow A2, which is the rearward direction.

When the sleeve 71 moves in the rearward direction, the bending units 71*c*1 and 71*c*2 separate from the wire W, and the wire W is released from being held by the bending units 71*c*1 and 71*c*2. Further, when the sleeve 71 moves in the rearward direction, the opening and closing pin 71*a* passes through the opening and closing guide hole 73. Accordingly, the first side hook 70L moves in the direction away from the center hook 70C by the rotation operation with the shaft 71*b* as a fulcrum. The second side hook 70R moves in the direction away from the center hook 70C by the rotation operation with the shaft 71*b* as a fulcrum. Accordingly, the wire W is removed from the wire locking body 70.

Example of Operation and Effect of Reinforcing Bar Binding Machine According to Second Embodiment As described above, by an operation in which the tension applying spring 92 is compressed when the sleeve 71 moves in the forward direction as indicated by the arrow A1, the front end side, which is one end portion, of the tension applying spring 92 is pressed, via the spacer 95, against the inner ring portion 94*a* of the prevention member 94 supporting the sleeve 71.

The inner ring portion 94*a* of the prevention member 94 supporting the sleeve 71 rotates in conjunction with the sleeve 71, and the spacer 95 comes into contact with the inner ring portion 94*a* of the prevention member 94 and rotates following the sleeve 71. The front end side of the tension applying spring 92 comes into contact with the spacer 95, and can rotate following the sleeve 71 and the inner ring portion 94*a* of the prevention member 94 via the spacer 95.

A rear end side, which is the other end portion, of the tension applying spring 92, comes into contact with the rotation regulating blade 74*a*. When the tension applying spring 92 is compressed when the sleeve 71 moves in the forward direction, the rear end side of the tension applying spring 92 is pressed against the rotation regulating blade 74*a* by a force for extending the compressed tension applying spring 92.

When the sleeve 71 rotates after moving in the forward direction, the rear end side of the tension applying spring 92 receives a force for rotating following the rotation of the sleeve 71 and the rotation regulating blade 74*a*. As described above, the front end side of the tension applying spring 92 can rotate following the sleeve 71 and the inner ring portion 94*a* of the prevention member 94 via the spacer 95.

Accordingly, when the sleeve 71 rotates after moving in the forward direction, the generation of the force for twisting the tension applying spring 92 is prevented by the tension applying spring 92 rotating following the sleeve 71, and a burden in a direction other than a direction in which the tension applying spring 92 is compressed and extended is prevented from being applied to the tension applying spring 92 which is a coil spring. Accordingly, durability of the tension applying spring 92 can be improved.

In addition, as another embodiment of a binding machine of the present invention, there can be provided a reinforcing bar binding machine including both of the above-described prevention member 93 in the first embodiment and the above-described prevention member 94 in the second embodiment. According to the reinforcing bar binding machine, the above-described effects of the first and second embodiments can be achieved.

What is claimed is:

1. A binding machine comprising:
- a rotation shaft driven by a motor to rotate;
- a movable body that moves in an axial direction of the rotation shaft in conjunction with the rotation of the rotation shaft and that rotates about the rotation shaft;
- an elastic body that is compressed by the movement of the movable body along the axial direction of the rotation shaft and that is configured to apply tension to a wire adapted to bind an object to be bound by an expanding force; and
- a prevention member configured to prevent generation of a force for twisting the elastic body by the rotation of the movable body, wherein:
- the movable body is rotatably supported by a main body portion via a support member,
- the elastic body includes a coil spring that is compressed and extended in an axial direction of the movable body along the axial direction of the rotation shaft, one end portion of the elastic body faces the support member, and the other end portion of the elastic body faces the prevention member,
- the one end portion of the elastic body is pressed against a portion of the support member, the portion being non-rotatable with respect to the main body portion, and
- the other end portion of the elastic body is pressed against the prevention member, and at least a portion of the prevention member, which is pressed by the elastic body, is prevented from rotating following the rotation of the movable body.

2. The binding machine according to claim 1, wherein the prevention member is configured to prevent rotation of the elastic body following the rotation of the movable body.

3. The binding machine according to claim 1, wherein the prevention member is configured to prevent rotation following the rotation of the movable body.

4. The binding machine according to claim 1, wherein the prevention member is provided between the elastic body and a member that is provided on the movable body and that is configured to regulate the rotation of the movable body.

5. The binding machine according to claim 1, wherein the prevention member has a plate shape.

* * * * *